United States Patent
Iwanaga et al.

(10) Patent No.: US 7,483,395 B2
(45) Date of Patent: Jan. 27, 2009

(54) NETWORK DEVICE WITH VLAN TOPOLOGY DISCOVERY FUNCTIONS

(75) Inventors: Tsukasa Iwanaga, Yokohama (JP); Kazuhiro Nakashima, Yokohama (JP); Kouji Sakata, Yokohama (JP)

(73) Assignee: Fujitsu Limited, Kawasaki (JP)

(*) Notice: Subject to any disclaimer, the term of this patent is extended or adjusted under 35 U.S.C. 154(b) by 705 days.

(21) Appl. No.: 11/034,681

(22) Filed: Jan. 13, 2005

(65) Prior Publication Data

US 2006/0002311 A1 Jan. 5, 2006

(30) Foreign Application Priority Data

Jun. 30, 2004 (JP) ............... 2004-193526

(51) Int. Cl.
*H04L 12/28* (2006.01)
*H04L 12/56* (2006.01)
(52) U.S. Cl. .................. 370/254; 370/252; 709/238
(58) Field of Classification Search .......... 370/252, 370/254–258, 237, 238, 400, 401; 709/238–244
See application file for complete search history.

(56) References Cited

U.S. PATENT DOCUMENTS 5,926,463 A * 7/1999 Ahearn et al. ............... 370/254
6,188,675 B1 2/2001 Casper et al.
6,456,597 B1 * 9/2002 Bare ........................ 370/252
2003/0063571 A1 4/2003 Ikeda et al.
2003/0135644 A1 * 7/2003 Barrett ...................... 709/238

FOREIGN PATENT DOCUMENTS

| JP | 10-093635 | 4/1998 |
| JP | 2003-115843 | 4/2003 |
| JP | 2004-040374 | 2/2004 |

* cited by examiner

Primary Examiner—John Pezzlo
(74) Attorney, Agent, or Firm—Katten Muchin Rosenman LLP

(57) ABSTRACT

A network device with integrated topology discovery functions adapted to virtual local area networks (VLANs). VLAN segments are mapped on a network system formed from multiple network devices. One network device creates and broadcasts a query packet for topology discovery in each VLAN, in response to a command from a management console linked to that network device. At each receiving network device, a query packet receiver receives the query packet, and a reply packet is produced by a reply packet generator. A reply packet transmitter sends the produced reply packet back to the requesting network device. A query packet transmitter forwards the received query packet to neighboring subordinate network devices.

12 Claims, 33 Drawing Sheets

11d MAC ADDRESS LEARNING TABLE

| PORT ID | MAC ADDRESS |
|---|---|
| 1 | 00:00:00:00:01:01 |
| | 00:00:00:00:01:02 |
| | 00:00:00:00:01:03 |
| | 00:00:00:00:01:04 |
| 2 | 00:00:00:00:02:06 |
| 3 | - |
| 4 | 00:00:00:00:03:01 |
| 5 | - |
| 6 | 00:00:00:00:04:01 |
| 7 | 00:00:00:00:05:01 |
| | 00:00:00:00:05:03 |
| | 00:00:00:00:05:04 |
| | 00:00:00:00:05:05 |
| | 00:00:00:00:05:07 |
| | 00:00:00:00:05:08 |
| | 00:00:00:00:05:09 |
| | 00:00:00:00:05:20 |
| 8 | - |
| 9 | 00:00:00:00:07:01 |
| 10 | 00:00:00:00:08:01 |

FIG. 5

91 VIRTUAL NETWORK DATABASE

| PORT ID | VLAN ID | LINK STATUS |
|---|---|---|
| 1 | 10 | Link up |
| 2 | 10 | Link up |
| 3 | 10 | Link up |
| 4 | 10 | Link up |

FIG. 11

92 MAC ADDRESS LEARNING TABLE

| PORT ID | MAC ADDRESS |
|---|---|
| 1 | - |
| 2 | 00:00:00:00:01:01 |
| 3 | 00:00:00:00:01:02 |
| 4 | 00:00:00:00:01:03 |

FIG. 12

93 VIRTUAL NETWORK DATABASE

| PORT ID | VLAN ID | LINK STATUS |
|---|---|---|
| 1 | 10,20,30 | Link up |
| 2 | 10 | Link up |
| 3 | 20 | Link up |
| 4 | 30 | Link up |

FIG. 13

94 MAC ADDRESS LEARNING TABLE

| PORT ID | MAC ADDRESS |
|---|---|
| 1 | 00:00:00:00:03:01 |
|   | 00:00:00:00:03:02 |
|   | 00:00:00:00:03:03 |
|   | 00:00:00:00:04:01 |
|   | 00:00:00:00:04:02 |
| 2 | 00:00:00:00:01:01 |
|   | 00:00:00:00:01:02 |
|   | 00:00:00:00:01:03 |
| 3 | 00:00:00:00:02:01 |
| 4 | 00:00:00:00:02:02 |

FIG. 14

95 VIRTUAL NETWORK DATABASE

| PORT ID | VLAN ID | LINK STATUS |
|---|---|---|
| 1 | 10,20,30 | Link up |
| 2 | 10,20,30 | Link up |

FIG. 15

96 MAC ADDRESS LEARNING TABLE

| PORT ID | MAC ADDRESS |
|---|---|
| 1 | 00:00:00:00:01:01 |
| | 00:00:00:00:01:02 |
| | 00:00:00:00:01:03 |
| | 00:00:00:00:02:01 |
| | 00:00:00:00:02:02 |
| 2 | 00:00:00:00:03:01 |
| | 00:00:00:00:03:02 |
| | 00:00:00:00:03:03 |
| | 00:00:00:00:04:01 |
| | 00:00:00:00:04:02 |

FIG. 16

97 VIRTUAL NETWORK DATABASE

| PORT ID | VLAN ID | LINK STATUS |
|---|---|---|
| 1 | 10,20,30 | Link up |
| 2 | 10,20,30 | Link up |
| 3 | 30 | Link up |
| 4 | 20 | Link up |

FIG. 17

98 MAC ADDRESS LEARNING TABLE

| PORT ID | MAC ADDRESS |
|---|---|
| 1 | 00:00:00:00:01:01 |
| | 00:00:00:00:01:02 |
| | 00:00:00:00:01:03 |
| | 00:00:00:00:02:01 |
| | 00:00:00:00:02:02 |
| 2 | 00:00:00:00:03:01 |
| | 00:00:00:00:03:02 |
| | 00:00:00:00:03:03 |
| 3 | 00:00:00:00:04:01 |
| 4 | 00:00:00:00:04:02 |

FIG. 18

99 VIRTUAL NETWORK DATABASE

| PORT ID | VLAN ID | LINK STATUS |
|---|---|---|
| 1 | 10,20,30 | Link up |
| 2 | 10 | Link up |
| 3 | 20 | Link up |
| 4 | 30 | Link up |

FIG. 19

100 MAC ADDRESS LEARNING TABLE

| PORT ID | MAC ADDRESS |
|---------|-------------------|
| 1 | - |
| 2 | 00:00:00:00:03:01 |
| 3 | 00:00:00:00:03:02 |
| 4 | 00:00:00:00:03:03 |

FIG. 20

QUERY PACKET

| | VLAN TAG | DESTINATION MAC ADDRESS | SOURCE MAC ADDRESS | TYPE | SIZE | MAIN CLASS | AUX CLASS |
|---|---|---|---|---|---|---|---|
| 101 | 10 | FF:FF:FF:FF:FF:FF | 00:00:00:01:00:01 | 8xxx | 6 | 1 | 1 |
| 102 | 20 | FF:FF:FF:FF:FF:FF | 00:00:00:01:00:01 | 8xxx | 6 | 1 | 1 |
| 103 | 30 | FF:FF:FF:FF:FF:FF | 00:00:00:01:00:01 | 8xxx | 6 | 1 | 1 |

```
VLAN10
L2SW-X[00:00:00:01:00:01]
   port1---L2SW-A1[1]---L2SW-A2[4]
         00:00:00:01:00:02  00:00:00:01:00:03
   port2---L2SW-B1[1]---L2SW-B2[2]
         00:00:00:01:00:04  00:00:00:01:00:05

VLAN20
L2SW-X[00:00:00:01:00:01]
   port1---L2SW-A1[2]
         00:00:00:01:00:02
   port2---L2SW-B1[3]---L2SW-B2[2]
         00:00:00:01:00:04  00:00:00:01:00:05

VLAN30
L2SW-X[00:00:00:01:00:01]
   port1---L2SW-A1[2]
         00:00:00:01:00:02
   port2---L2SW-B1[3]---L2SW-B2[2]
         00:00:00:01:00:04  00:00:00:01:00:05
```

VLAN10
00:00:00:01:00:01   port1-00:00:00:01:00:02  port2-00:00:00:01:00:03  port2[Link up]
                                                                      port3[Link up]
                                                                      port4[Link up]
                    port2-00:00:00:01:00:04  port2-00:00:00:01:00:05  port2[Link up]

VLAN20
00:00:00:01:00:01   port1-00:00:00:01:00:02  port3[Link up]
                    port2-00:00:00:01:00:04  port2-00:00:00:01:00:05  port2[Link up]
                    00:00:00:01:00:04        port4[Link up]

VLAN30
00:00:00:01:00:01   port1-00:00:00:01:00:02  port4[Link up]
                    port2-00:00:00:01:00:04  port2-00:00:00:01:00:05  port4[Link up]
                    00:00:00:01:00:04        port3[Link up]
```

| VLAN10 | | |
|---|---|---|
| DEVICE MAC ADDRESS | IN | OUT |
| 00:00:00:01:00:01 | - | port#1 |
| 00:00:00:01:00:02 | port#2 | port#3 |
| 00:00:00:01:00:03 | port#1 | port#5 |
| 00:00:00:01:00:06 | port#1 | port#9 |

FIG. 33

NETWORK DEVICE WITH VLAN TOPOLOGY DISCOVERY FUNCTIONS

CROSS-REFERENCE TO RELATED APPLICATIONS

This application is based upon and claims the benefits of priority from the prior Japanese Patent Application No. 2004-193526, filed on Jun. 30, 2004, the entire contents of which are incorporated herein by reference.

BACKGROUND OF THE INVENTION

1. Field of the Invention

The present invention relates to network devices, and more particularly to a network device for building virtual networks.

2. Description of the Related Art

In network management, system administrators need to understand how the network is laid out. To identify the topology of a network, they use Packet Internet Grouper (ping) commands from a terminal console (e.g., personal computer) attached to the network. A ping command verifies end-to-end connectivity to a specified destination.

Topology discovery can also be achieved by using a dedicated network monitoring tool or a computer with equivalent software functions. Examples are seen in Japanese Patent Application Publications No. 10-93635 (1998) and No. 2003-115843.

Virtual local area network (VLAN) technology enables a single physical network to be logically segmented into multiple networks. A network design tool proposed in Japanese Patent Application Publication No. 2004-40374 permits a network engineer to view the structure of a physical network and VLAN segments in an associated manner. This tool makes it easy to design and maintain a VLAN environment.

In real-world implementations, a large network accommodates several tens to several hundreds of VLAN domains mapped on a single physical network. The existing management tools such as those proposed in the aforementioned publications are unable to offer the capability of VLAN topology discovery per se. There has been an unfulfilled demand for devices that can discover the topology of a network system including many VLAN segments.

SUMMARY OF THE INVENTION

In view of the foregoing, it is an object of the present invention to provide a network device with integrated topology discovery functions adapted to VLANs.

To accomplish the above object, the present invention provides a network device for building virtual networks. This network device has the following elements: a query packet receiver, a reply packet generator, a reply packet transmitter, and a query packet transmitter. The query packet receiver receives a query packet from a requesting network device, wherein the query packet requests information for topology discovery of a specified virtual network. The reply packet generator produces a reply packet in response to the query packet that is received. The reply packet transmitter sends the reply packet back to the requesting network device. The query packet transmitter forwards the received query packet to subordinate network devices.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 shows an example data structure of a MAC address learning table.

FIG. 11 shows a first example of a virtual network database in a network device.

FIG. 12 shows a first example of a MAC address learning table in a network device.

FIG. 13 shows a second example of the virtual network database in a network device.

FIG. 14 shows a second example of the MAC address learning table in a network device.

FIG. 15 shows a third example of the virtual network database in a network device.

FIG. 16 shows a third example of the MAC address learning table in a network device.

FIG. 17 shows a fourth example of the virtual network database in a network device.

FIG. 18 shows a fourth example of the MAC address learning table in a network device.

FIG. 19 shows a fifth example of the virtual network database in a network device.

FIG. 20 shows a fifth example of the MAC address learning table in a network device.

FIG. 21 shows example query packets originated by a network device.

FIG. 25 shows a first example of a network topology diagram displayed on a monitor screen.

FIG. 26 shows a second example of a network topology diagram displayed on a monitor screen.

FIG. 33 shows an example screen displaying a packet delivery route.

DESCRIPTION OF THE PREFERRED EMBODIMENTS

Figure 1:
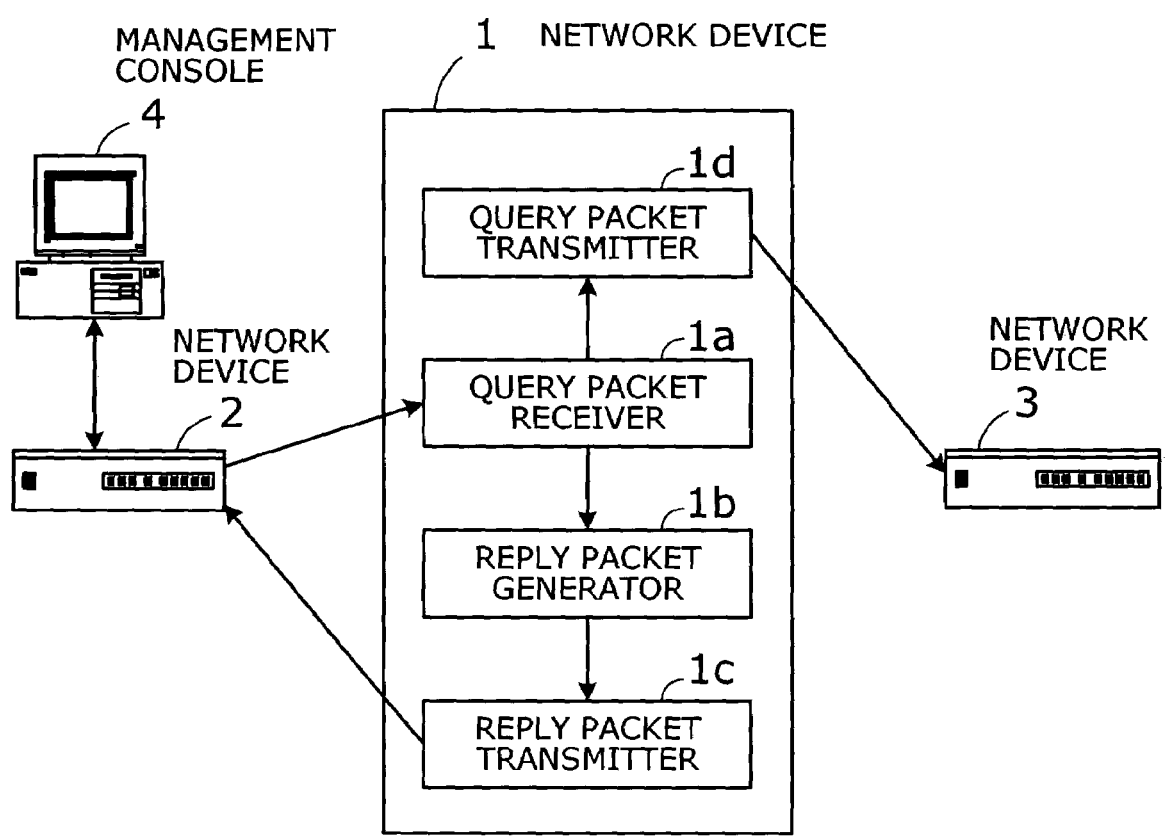
FIG. 1 is a conceptual view of a network device according to the present invention.

Preferred embodiments of the present invention will now be described in detail below with reference to the accompanying drawings, wherein like reference numerals refer to like elements throughout.

Referring first to FIG. 1, the concept of the present invention will be described below. FIG. 1 is a conceptual view of a network device according to the present invention. A plurality of network devices 1 to 3 form a network system, which can be logically divided into two or more broadcast domains, known as virtual LANs (VLANs). Those network devices 1 to 3 are interconnected via, for example, Ethernet (TM) or fiber optic links. Coupled to one network device 2 is a management console 4. In response to a command from this management console 4, the network device 2 creates a query packet for topology discovery of a particular VLAN and sends the produced query packet to its subordinate network device 1 in the relevant VLAN.

The network device 1 shown in the middle of FIG. 1 comprises a query packet receiver 1a, a reply packet generator 1b, a reply packet transmitter 1c, and a query packet transmitter 1d. These elements provide the following functions:

The query packet receiver 1a receives query packets that have been transmitted separately for each LAN. The reply packet generator 1b creates a reply packet in response to each query packet received by the query packet receiver 1a. The reply packet transmitter 1c sends the produced reply packet back to the requesting network device 2. The query packet transmitter 1d forwards the received query packet to a subordinate network device 3. While details are not shown in FIG. 1, the other network devices 2 and 3 have the same functions as those in the network device 1 described above.

With the above functional elements, a query packet is delivered from a requesting network device 2 to its subordinate network devices 1 and 3. The receiving network devices 1 and 3 produce a reply packet corresponding to the query packet and send it back to the requesting network device 2. In the case that the network device 3 had a subordinate network device with the same functions as those of the network device 1, that subordinate network device would forward the received query packet to its own subordinate network devices, as well as returning a reply packet to the requesting network device 2. In this way, the network device 2 can receive reply packets from all the other network devices, thus making it possible to discover the network topology of each specified VLAN.

Figure 2:
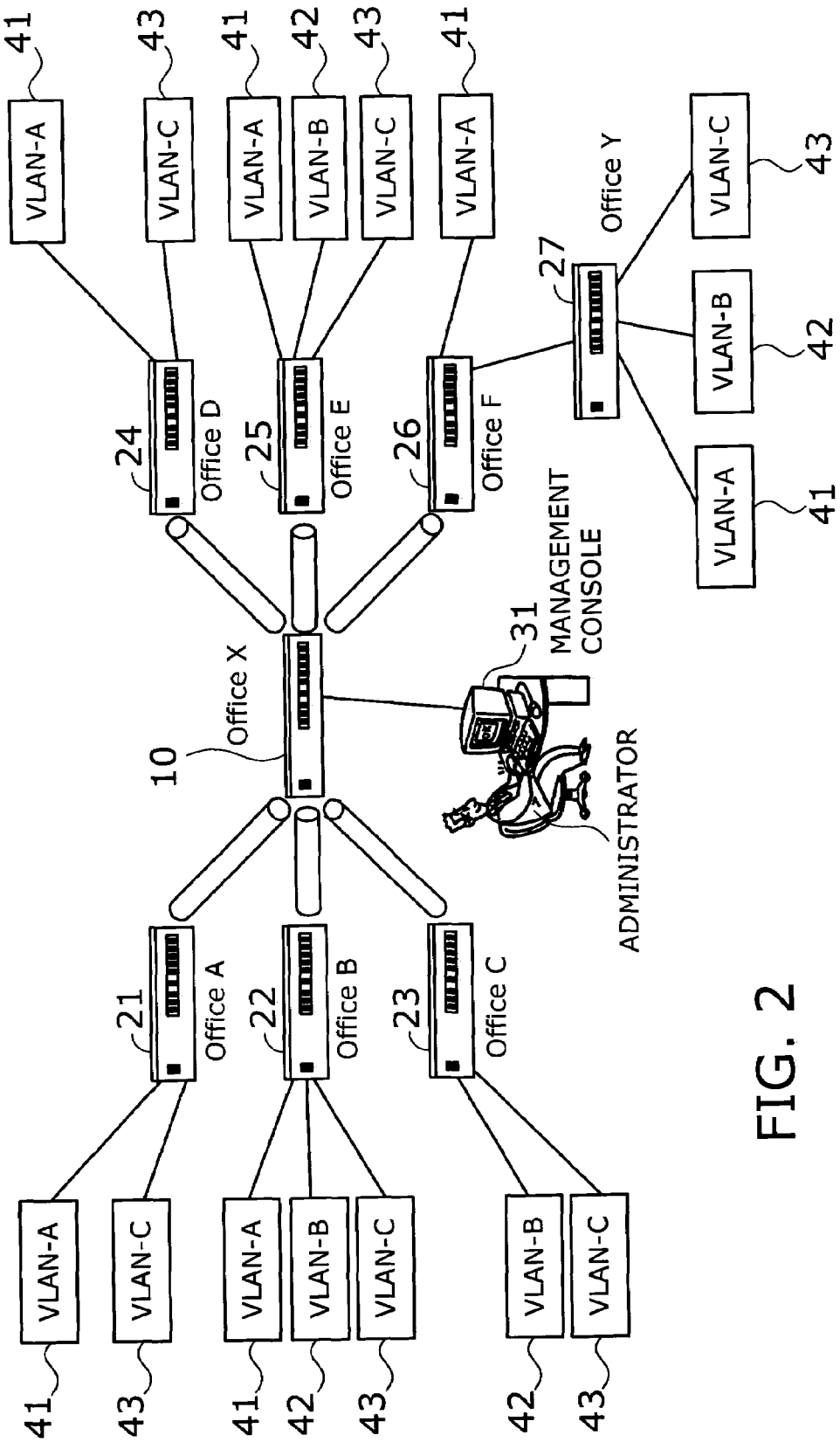
FIG. 2 shows an example system configuration of a network device according to a first embodiment of the present invention.

Referring now to FIG. 2 and subsequent diagrams, a first embodiment of the present invention will be described below. FIG. 2 shows an example system configuration involving network devices according to a first embodiment of the invention. The illustrated system has a network device 10 at a central location, to which a plurality of network devices 21 to 26 and a management console 31 are connected in a star topology. The management console 31 serves as a station for a network administrator to manage the VLAN system. Connected to the network device 26 is yet another network device 27. Those network devices 10, 21 to 26, and 27 are distributed in different offices X, A to F, and Y. They are interconnected by, for example, Ethernet links or fiber optic links.

The network devices 10 and 21 to 27 form a single physical network, on which a plurality of VLAN environments are provided to different user groups of, for example, enterprises or other organizations. Actually the illustrated network system of FIG. 2 contains the following three VLAN environments: VLAN-A 41, VLAN-B 42, and VLAN-C 43. The network devices 10 and 21 to 27 are layer-2 switches providing switched paths for delivering packets according to the layer-2 specifications of the ISO reference model. More specifically, every network device has a local database of MAC addresses of terminal devices connected at each port. Path switching is achieved on the basis of such MAC address information.

Every network devices 10 and 21 to 27 has a function of sending a query packet about VLAN topology to neighboring subordinate network devices, according to a command from the administrator. Another function is to receive a query packet from other network devices and forward that packet as a query forwarding packet to its neighboring subordinate network devices. The network devices 10 and 21 to 27 also have a function to create a reply packet upon receipt of a query packet or query forwarding packet, and to send the reply packet back to the original sender of that query packet or query forwarding packet.

In the example of FIG. 2, the network device 10 sends a query packet to immediately adjacent network devices 21 to 26 according to a command received from the management console 31. Upon arrival of this query packet, the receiving network devices 21 to 26 produce and send a reply packet back to the requesting network device 10. Since it has a subordinate network device 27, the network device 26 at Office F forwards the received query packet to that subordinate network device 27. This packet is a query forwarding packet. In response to the query forwarding packet received, the subordinate network device 27 produces and sends a reply packet back to the requesting network device 10 through the intermediate network device 26.

Although not depicted in FIG. 2, every other network device 21 to 27 has a function to produce a query packet according to commands from an administrator, just as the central network device 10 does. The network device 10 also has a function to deliver query forwarding packets and reply packets, just as the network device 21 to 27 do. Suppose, for example, that the management console 31 was linked to, for example, a different network device 21, instead of the network device 10. In this case, the network device 21 would originate a query packet to its adjacent network device 10. The network device 10 would then transmit a query forwarding packet to its neighboring network devices 22 to 26, as well as returning a reply packet to the requesting network device 21.

The network device 10 analyzes received reply packets to discover the topology of each particular VLAN domain. The resultant information on the identified VLAN topology is passed to the management console 31, and the management console 31 shows this discovery result on its monitor screen in an appropriate data layout. As an alternative configuration, such topology analysis functions may be implemented in the management console 31, rather than in the network device 10. In this case, the network device 10 forwards all received reply packets to the management console 31, so that the data to be analyzed and displayed on the management console 31.

First Embodiment

Figure 3:
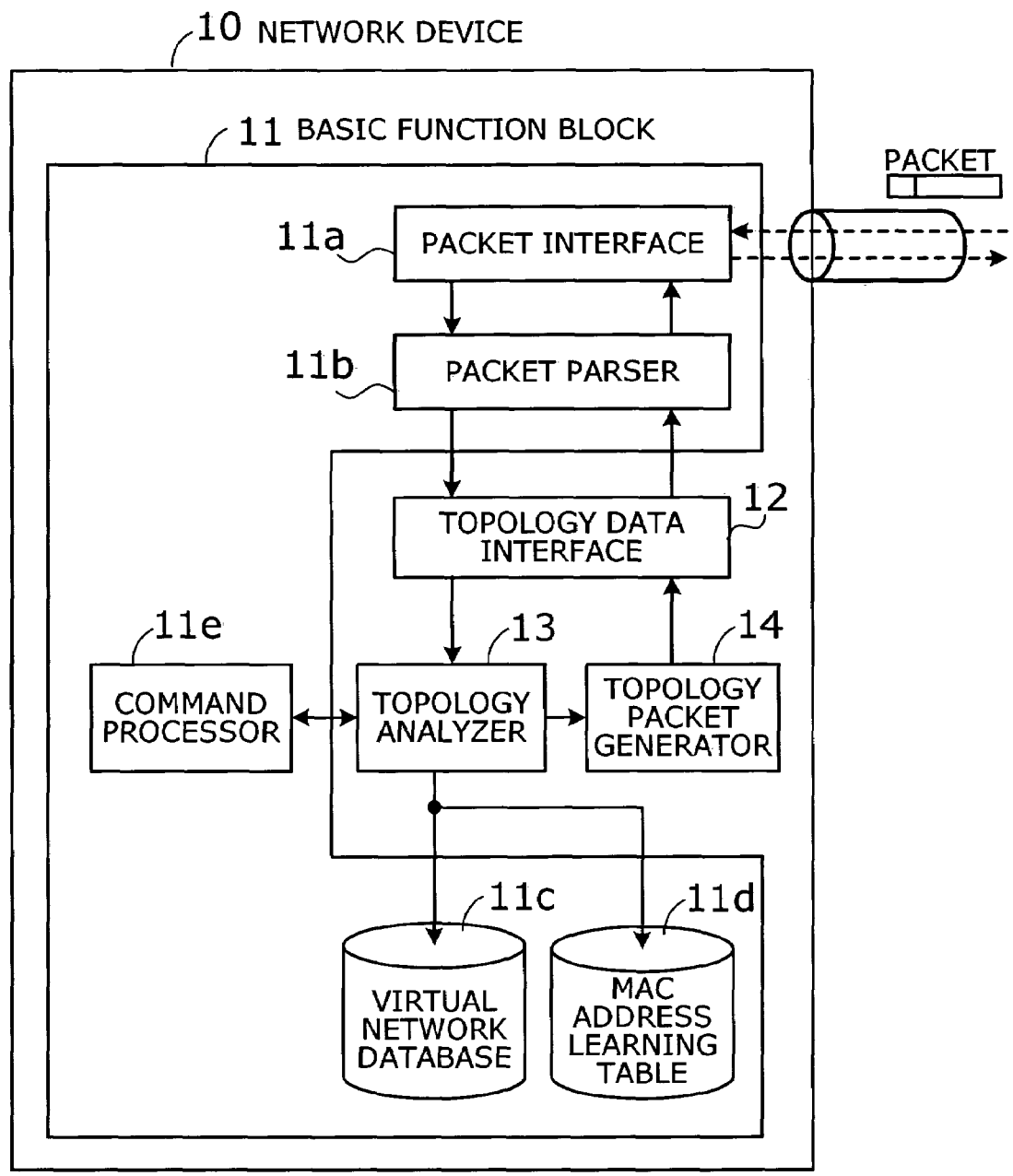
FIG. 3 is a functional block diagram of a network device according to the first embodiment.

This section describes a network device according to a first embodiment of the present invention. FIG. 3 is a functional block diagram of a network device 10 according to a first embodiment. As seen from the diagram, the network device 10 contains a basic function block 11, a topology data interface 12, a topology analyzer 13, and a topology packet generator 14. Note that other network devices 21 to 27 in FIG. 2 have the same functional blocks as those of the network device 10 depicted in FIG. 3.

The basic function block 11 offers various fundamental facilities for transmitting and receiving packets to/from peer network devices. Specifically, the basic function block 11 contains a packet interface 11a, a packet parser 11b, a virtual network database 11c, a MAC address learning table 11d, and a command processor 11e. Those elements have the functions described as follows:

The packet interface 11a serves to transmit and receive packets to/from other network devices. Incoming packets arriving at the packet interface 11a include: query packets, query forwarding packets, reply packets, and other ordinary packets exchanged back and forth between terminals. The packet parser 11b sorts out those incoming packets according to their types, and if the received packet is either a query packet, query forwarding packet, or reply packet, the packet parser 11b routes it to the topology data interface 12. Also handled by the packet parser 11b are outgoing packets produced by the topology data interface 12, which include: query packets, query forwarding packets, and reply packets. The packet parser 11b passes those outbound packets to the packet interface 11a for transmission.

Figure 4:
FIG. 4 shows an example data structure of a virtual network database.

The virtual network database lie is a database storing information about for which VLAN each port of the network device 10 is used. This virtual network database 11c is constructed on a physical storage medium such as hard disk drives (HDD) or random access memory devices (RAM). FIG. 4 shows an example data structure of the virtual network database 11c, which has the following data fields: "Port ID," "VLAN ID," and "Link Status." The port ID field contains the identifier of each port of the network device 10. In the present example, the network device 10 has ten ports with different IDs of #1 to #10. The next VLAN ID field shows the identifiers of VLANs associated with each port. Specifically, VLAN IDs #10, #20, and #30 represent the VLAN-A 41, VLAN-B 42, and VLAN-C 43 mentioned earlier in FIG. 2. The VLAN ID field may contain a symbol of "-" to indicate that the corresponding port is not assigned to any particular VLANs. The link status field shows the current status of each port, which is either a "link up" (active) state or a "link down" (inactive) state.

Take port #2 of the network device 10, for instance. The virtual network database 11c of FIG. 4 shows that port #2 is assigned to all VLANs 41, 42, and 43 identified by VLAN IDs #10, #20, and #30, respectively, and also that its corresponding link is in an active state. Likewise, the virtual network database 11c gives a record for port #3 of the network device 10, which shows that port #3 belongs to VLAN-B 42 with a VLAN ID of #20, but that the corresponding link is currently inactive.

Referring back to FIG. 3, the MAC address learning table 11d is a table showing what devices are connected to each port of the network device 10. Specifically, every linked device can be recognized at the corresponding port, and its MAC address is registered with the MAC address learning table 11d. This MAC address learning table 11d is constructed on a physical storage medium such as HDD or RAM.

FIG. 5 shows an example data structure of a MAC address learning table. The illustrated MAC address learning table 11d has "Port ID" and "MAC Address" fields. As in the virtual network database 11c of FIG. 4, the port ID field contains the identifier of each port of the network device 10. For each particular port, the MAC address field shows the MAC address(es) of a device(s) being connected, while the symbol "-" indicates that no devices are connected to the corresponding port.

Specifically, the MAC address learning table 11d of FIG. 5 shows that the network device 10 is linked to four devices through port #1. Their MAC addresses are: 00:00:00:00:01:01, 00:00:00:00:01:02, 00:00:00:00:01:03, and 00:00:00:00:01:04. The next port #2 is connected to a device with a MAC address of 00:00:00:00:02:06.

Referring back to FIG. 3, the command processor 11e receives commands from the management console 31 (not shown). The topology data interface 12 supplies the topology analyzer 13 with incoming query packets, query forwarding packets, and reply packets extracted by the packet parser 11b. The topology data interface 12 also provides the packet parser 11b with outgoing query packets, query forwarding packets, and reply packets produced by the topology packet generator 14.

The topology analyzer 13 provides various services outlined below. First, the topology analyzer 13 instructs the topology packet generator 14 to produce a query packet, when the command processor 11e recognizes a relevant command from the management console 31.

In the case where the management console 31 is attached to other network device, the network device 10 of FIG. 3 has a chance to receive a query packet or query forwarding packet. The topology analyzer 13 then instructs the topology packet generator 14 to create a query forwarding packet by appending some information about the network device 10 itself to that received packet. At the same time, the topology analyzer 13 requests the topology packet generator 14 to create a reply packet as a response to the query packet or query forwarding packet that is received.

Further, the topology analyzer 13 looks into every reply packet collected from other network devices to discover the topology of VLANs organized by the network devices 21 to 27. The topology analyzer 13 sends the result to the management console 31 for display on its monitor screen.

Lastly, the topology analyzer 13 makes access to the virtual network database 11c and MAC address learning table 11d to retrieve necessary information for the topology packet generator 14 to create a query packet, query forwarding packet, or reply packet.

The topology packet generator 14 produces query packets, query forwarding packets, and reply packets as instructed by the topology analyzer 13. The produced packets are passed to the topology data interface 12 for transmission.

Query Packet and Query Forwarding Packet

This section gives an overview of VLAN layer-2 packet format and then describes query packets and query forwarding packets in detail.

Figure 6:
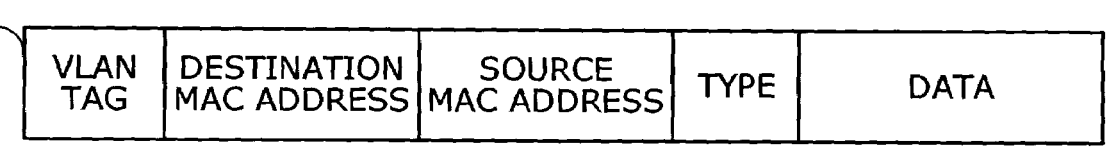
FIG. 6 shows an example data sequence of a packet in VLAN Layer 2.

FIG. 6 shows an example data sequence of packets used in the VLAN layer 2. As can be seen, a VLAN layer-2 packet 51 is composed of the following fields: "VLAN Tag" (4 bytes), "Destination MAC Address" (6 bytes), "Source MAC Address" (6 bytes), "Type" (2 bytes), and "Data" (variable length). The VLAN tag field carries an identifier indicating for which VLAN the packet 51 is intended. This identifier is called "VLAN ID" and is defined and used in the IEEE 802.1q standard. The destination MAC address field contains a MAC address specifying which network device should receive the packet 51. The source MAC address field contains a MAC address identifying the sending network device. The type field shows to which protocol version the packet 51 conforms. For example, this field contains a value of 0x86DD when the packet 51 conforms to the Internet Protocol Version 6 (IPv6) specifications.

Figure 7:
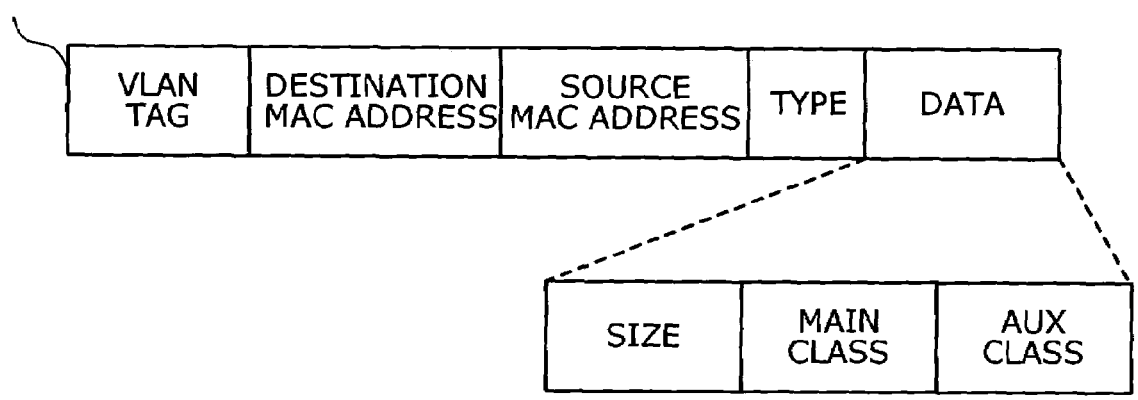
FIG. 7 shows an example data sequence of a query packet.

FIG. 7 shows an example data sequence of a query packet. As can be seen, this query packet 52 has the following fields: "VLAN Tag," "Destination MAC Address," "Source MAC Address," "Type," and "Data" The last "Data" field is divided into "Size," "Main Class," and "Aux Class" fields. This packet frame structure is compatible with the VLAN layer-2 packet 51 of FIG. 6, thus permitting query packets 52 to be delivered by network devices with layer-2 switching functions.

The VLAN tag field contains a VLAN ID indicating for which VLAN domain the query packet 52 is intended. To find the topology of, for example, VLAN-A 41, the VLAN tag field will carry a value of "10," which is the identifier of VLAN-A. The destination MAC address field contains a value of "FF:FF:FF:FF:FF:FF" to specify that the query packet 52 be broadcast to all network devices in a relevant domain. The source MAC address field contains a MAC address identifying the sending network device. In the example of FIG. 2, the network device 10 is coupled to a management console 31 that issues commands for topology discovery, and thus it originates query packets 52 to other network device 21 to 26 according to a given command. Accordingly, the source MAC address field of such a query packet 52 carries the MAC address of the sending network device 10. The type field contains a type code indicating that the packet is intended for topology discovery. A new, unused type code is assigned for this purpose.

The size field contains a two-byte value representing the total length of the size, main class, and aux class fields. The main class field contains a code "1" to indicate that this packet 52 is a query packet. The auxiliary class (shortened to "aux class" in the accompanying drawings) fields contains a value of either "1" or "2." The former value "1" shows that the query packet 52 is to request the receiving network devices to return the number of VLAN ports, and the latter value "2" indicates that the recipient is supposed to report whether each port is in a link-up state or a link-down state.

As briefly described in FIG. 3, the topology analyzer 13 instructs the topology packet generator 14 to produce a query packet 52, in response to a command parsed by the command processor 11e. The resulting query packet 52 is transmitted from the network device 10 to its neighboring subordinate network devices 21 to 26. The receiving network devices 21 to 26 respond to this query packet 52 by returning a reply packet to the requesting network device 10, as will be described in detail later. They also forward the received query packet as a query forwarding packet to their neighboring subordinate network devices.

Figure 8:
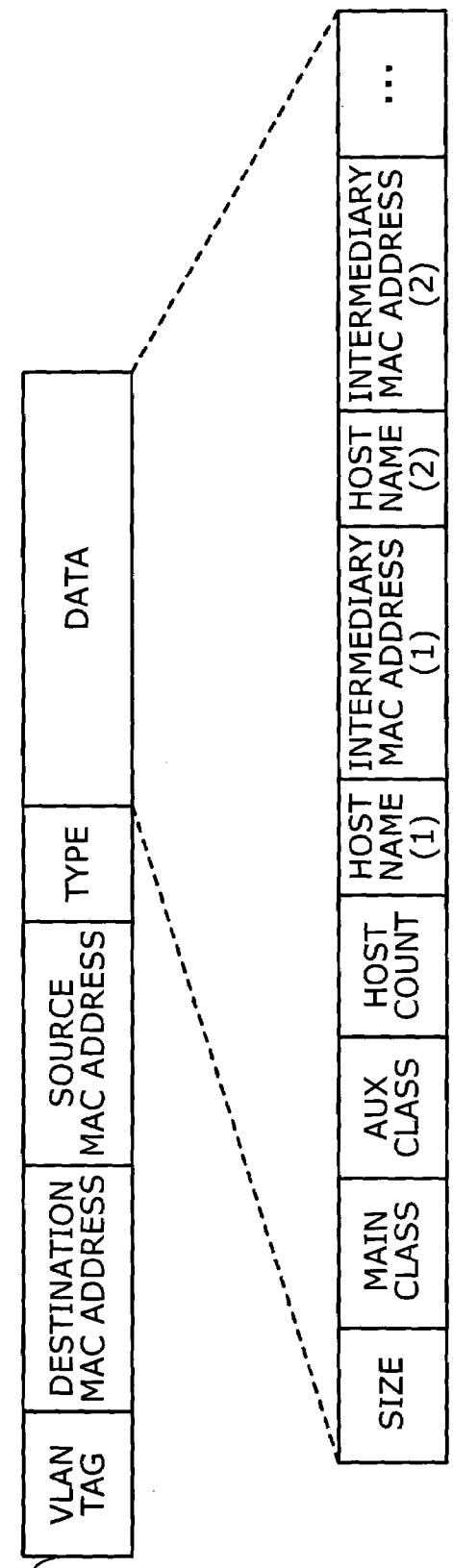
FIG. 8 shows an example data sequence of a query forwarding packet.

FIG. 8 shows an example data sequence of a query forwarding packet. This query forwarding packet 53 has the following fields: "VLAN Tag," "Destination MAC Address," "Source MAC Address," "Type," and "Data." The last "Data" field is divided into multiple fields including, among others, "Size," "Main Class," and "Aux Class" as in the query packet 52 of FIG. 7. Additional fields of the query forwarding packet 53 are: "Host Count," "Host Name," and "Intermediary MAC Address." This packet frame structure is compatible with the packet 51 of FIG. 6, thus permitting query forwarding packets 53 to be delivered by network devices with layer-2 switching functions. The following will explain the fields that are different from those of the query packet 52 explained in FIG. 7.

The host count field contains a number indicating how many hosts (network devices) this query forwarding packet 53 has passed before the current host is reached. The host name field contains the name of a host that the query forwarding packet 53 has passed, and the subsequent intermediary MAC address field carries the MAC address of that host. Each time the query forwarding packet 53 passes through a host, the host count field is updated with a new host count (i.e., incremented by one), and a new set of host name and intermediary MAC address fields are appended to the end of the query forwarding packet 53. FIG. 8 illustrates two such instances.

As explained briefly in FIG. 3, the topology analyzer 13 instructs the topology packet generator 14 to create a query forwarding packet 53 when a query packet 52 is received, or to update the content of a query forwarding packet 53 when it is received from some other network device. Specifically, the topology packet generator 14 achieves this by appending the local host name and MAC address to the received packet, as well as adding one to the host count field. The newly created or updated query forwarding packet 53 is then transmitted to neighboring subordinate network devices and subjected to the same processing at each receiving network device.

Referring back to FIG. 2, suppose that the administrator sitting at the management console 31 has issued a command to the network device 10 to transmit a query packet 52. In response to this command, the network device 10 sends out a query packet 52 to neighboring network devices 21 to 26. The network device 26 then appends some new fields ("number of hosts," "host name," "intermediary MAC address") to the received query packet 52, thereby producing a query forwarding packet 53 for its subordinate network device 27. The newly added host count field contains an initial value of one since the network devices 26 serves as the first intermediary host. Thus the host name and intermediary MAC address fields contain the host name and MAC address of the network device 26, which is about to send this query forwarding packet 53. If there was another network device beyond the network device 27, the query forwarding packet 53 would be retransmitted from the network device 27, with a similar set of additional information fields, and with the host count field incremented to two.

Reply Packet

Figure 9:
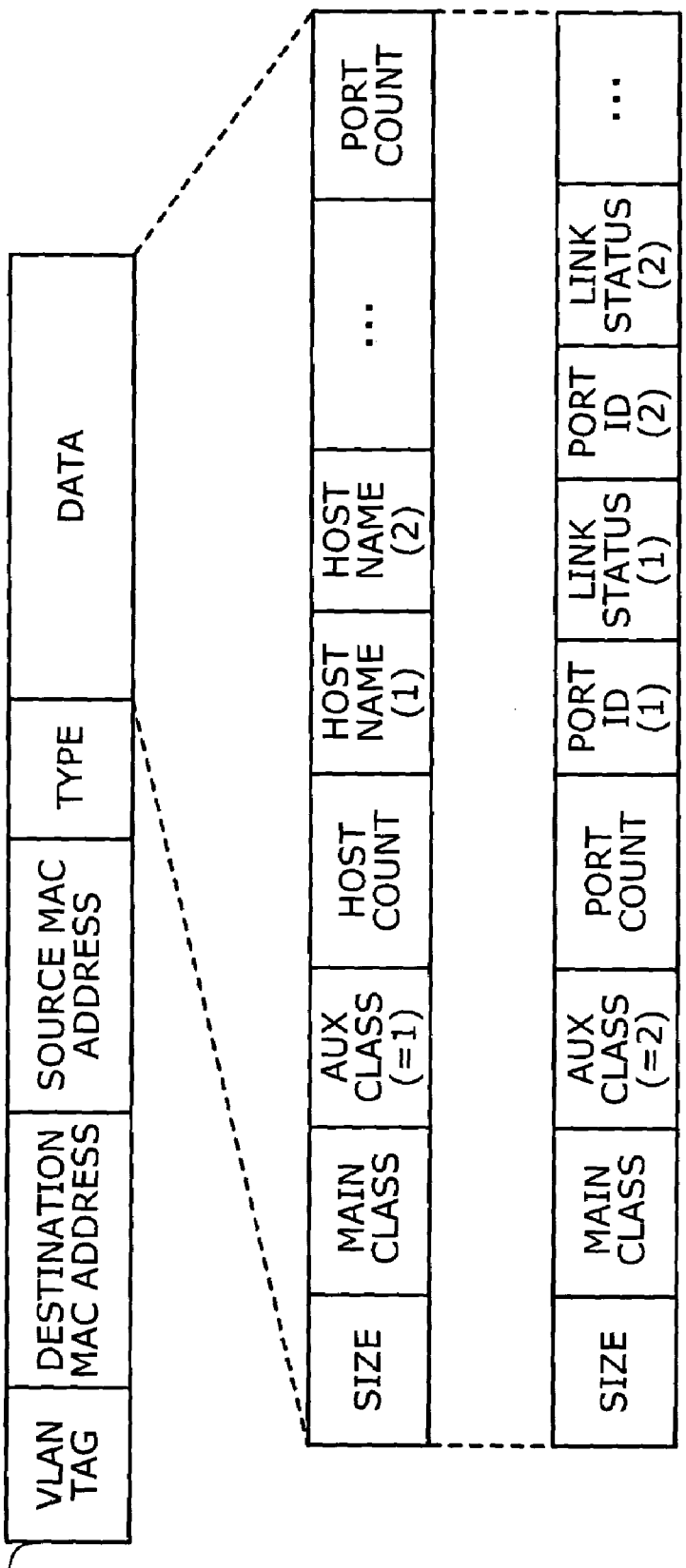
FIG. 9 shows an example data sequence of a reply packet.

This section describes reply packets in greater detail. Reply packets are returned as an answer to a query packet 52 or query forwarding packet 53, from the receiving network devices 21 to 27 to the requesting network device 10. FIG. 9 shows an example data sequence of a reply packet. As can be seen, the reply packet 54 has the following fields: "VLAN Tag," "Destination MAC Address," "Source MAC Address," "Type," and "Data." Those fields are identical to what has been explained as a VLAN layer-2 packet in FIG. 6. The last "Data" field, however, is divided into a plurality of fields and the definition of those fields depends on the auxiliary class value. When the auxiliary class is set to "1," the data field contains "Size," "Main Class," "Aux Class," "Host Count," "Host Name," and "Port Count." When the auxiliary class is set to "2," the data field contains "Size," "Main Class," "Aux Class," "Port Count," "Port ID," and "Link Status." This packet frame structure is compatible with the packet 51 of FIG. 6, thus permitting reply packets 54 to be delivered by the network devices with layer-2 switching functions.

The VLAN tag field contains a VLAN ID that shows for which VLAN domain the reply packet 54 is intended. The destination MAC address field carries the MAC address of the original sender of the query packet 52, which is the network device 10 in the context of FIG. 2. The source MAC address field contains the MAC address of the present network device that is sending back this reply packet 54. The type field contains a type code indicating topology discovery purposes, for which a new, unused type code is assigned.

The above fields are identical to those of the layer-2 packet explained in FIG. 6. The "Data" field, however, is divided into a plurality of fields, and their arrangement depends on the auxiliary class value of the query packet 52 or query forwarding packet 53 being responded to. When the auxiliary class is set to "1," the data field carries the following items: "Size," "Main Class," "Aux Class," "Host Count," "Host Name," and "Port Count." When the auxiliary class is set to "2," the data field carries the following items: "Size," "Main Class," "Aux Class," "Port Count," "Port ID," and "Link Status."

More specifically, the data field of a reply packet 54 begins with a size field that indicates the total length of the size field itself and all succeeding data fields mentioned above. This is followed by a main class field containing a code "2" to indicate that this packet 51 is a reply packet. Subsequently, the auxiliary class field carries a code suggesting what the reply packet 54 actually contains. Aux Class=1 means that the packet 54 reports the number of VLAN ports of a particular host, whereas Aux Class=2 means that the packet 54 carries information as to whether each port is in a link-up state or in a link-down state.

In the case of Aux Class=1, the subsequent host count field gives the number of network devices through which the original query packet 52 and consequent query forwarding packet 53 have passed. This is followed by one or more host name fields indicating the host names of all intermediate network devices that have relayed the original query packet 52 and query forwarding packet 53. The last item is a port count field, which shows how many VLAN ports are available at the responding network device (i.e., the sender of this reply packet 54). Note that the number of ports is counted for a particular VLAN domain that is specified by a VLAN ID in the VLAN tag field.

In the case of Aux Class=2, on the other hand, the subsequent port count field contains the number of VLAN ports of the responding network device. This is counted for a particular VLAN domain that is specified by a VLAN ID in the VLAN tag field. The port count is followed by one or more pairs of port ID and link status fields indicating the current status of each relevant VLAN port of the responding network device. The link status takes a value of either "1" (link up) or "2" (link down).

As briefly explained earlier in FIG. 3, the topology analyzer 13 commands the topology packet generator 14 to create a reply packet 54 so as to respond to a query packet 52 or a query forwarding packet 53 that is received. Besides directing the topology packet generator 14 to use the received query information, the topology analyzer 13 retrieves necessary data from a virtual network database 11*c* and MAC address learning table 11*d* to assist the topology packet generator 14 in creating a reply packet 54.

Suppose, for example, that a query packet 52 has arrived at an intermediate network device 21, which is remote from the management console 31. Also assume that the received query packet 52 has an auxiliary class value of "1"; i.e., it is a query about the number of VLAN ports. Within the responding network device 21, the topology analyzer activates its local topology packet generator to compile a reply packet 54. The topology packet generator first copies VLAN tag and MAC address information from the VLAN tag field and source MAC address field of the received query packet 52 to the VLAN tag field and destination MAC address field of the reply packet 54, respectively. The topology packet generator then fills in the source MAC address field with the MAC address of the network device 21, as well as entering a particular type code into the type field to indicate topology discovery purposes. It also sets a correct data length to the size field and a code "2" to the main class field to indicate that this packet is a reply packet. The subsequent auxiliary class field should contain a code "1" to indicate that the responding network device 21 is answering a query about the number of VLAN ports. The topology packet generator enters zero to the host count field because this is a response to a query packet 52, or in other words, there are no intermediate hosts. The name of the responding network device 21 is then set to host name field, and the number of ports of the same to the port count field.

Suppose now that the received query packet 52 has an auxiliary class value of "2," meaning that it is a query about link status. With a command from the topology analyzer, the topology packet generator creates a reply packet 54. The port count field is filled in with the number of ports of the responding network device 21. This is followed by one or more sets of port ID and link status fields to indicate which port is in what state.

Topology Discovery Operation

Figure 10:
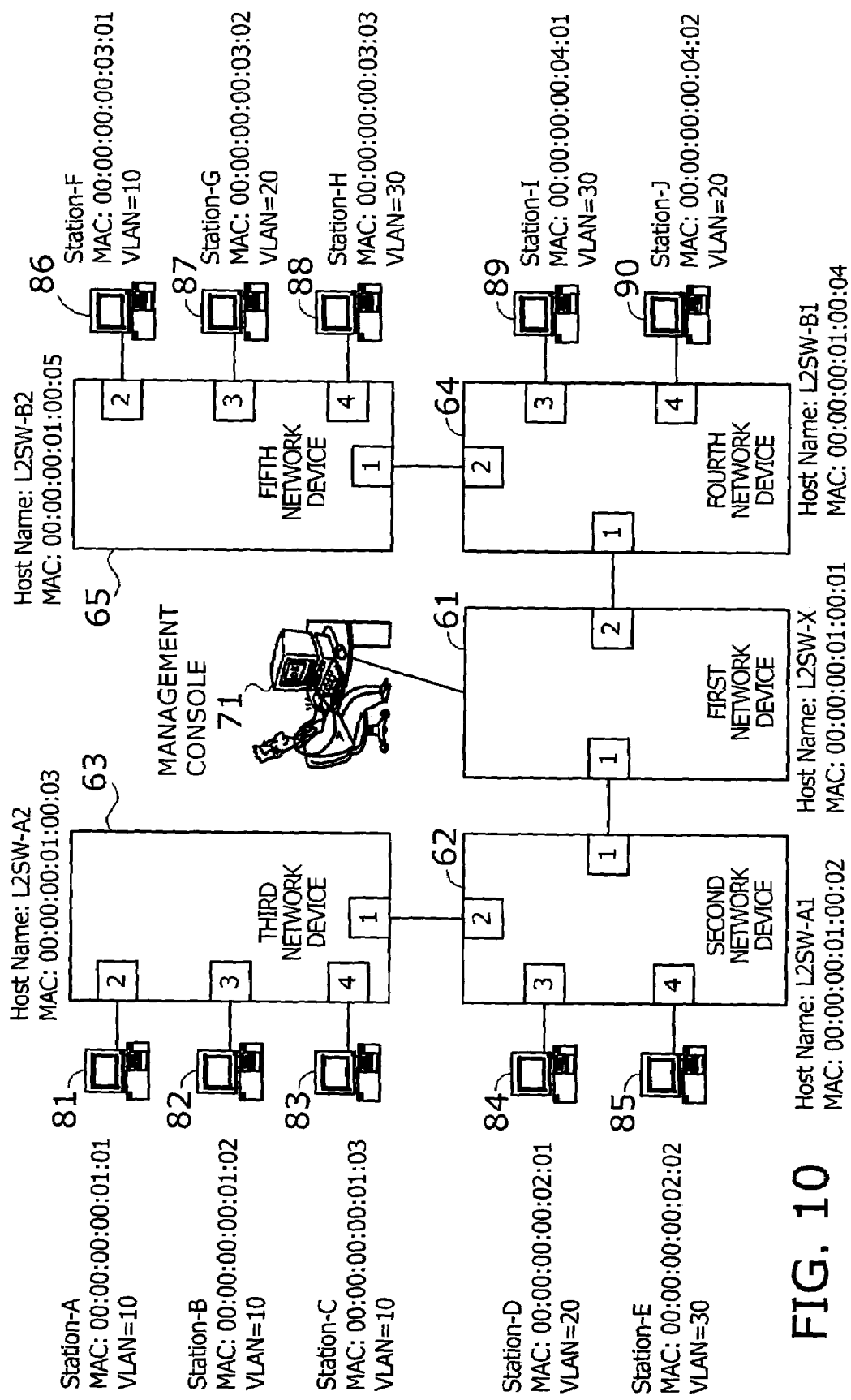
FIG. 10 shows an example system for explaining how the proposed network device operates.

FIG. 10 shows an example system to explain how the proposed network device operates. As can be seen, a network administrator sits at his management console 71, which is linked to a first network device 61. The first network device 61 is connected to a second and fourth network devices 62 and 64. The latter two network devices 62 and 64 are further linked to a third and fifth network devices 63 and 65, respectively. Those five network devices 61 to 65 form a network system accommodating three VLAN domains designated by different VLAN IDs "10," "20," and "30."

The first network device 61 has a host name of "L2SW-X" and a MAC address of "00:00:00:01:00:01." It has two network ports, which are distinguished locally by their port IDs, "1" and "2."

The second network device 62 has a host name of "L2SW-A1" and a MAC address of "00:00:00:01:00:02." It has four ports with port IDs "1" to "4." Terminals 84 and 85 are linked respectively to ports #3 and #4 of the second network device 62. The former terminal 84 has a terminal name of "Station-D" and a MAC address of "00:00:00:00:02:01" and belongs to VLAN #20 (VLAN domain with a VLAN ID of 20). The latter terminal 85 has a terminal name of "Station-E" and a MAC address of "00:00:00:00:02:02" and belongs to VLAN #30. Port #2 of the second network device 62 is used to link with the third network device 63 at its port #1.

The third network device 63 has a host name of "L2SW-A2" and a MAC address of "00:00:00:01:00:03." It has four ports with port IDs "1" to "4." Terminals 81, 82, and 83 are linked respectively to ports #2, #3, and #4. The terminal 81 has a terminal name of "Station-A" and a MAC address of "00:00:00:00:01:01" and belongs to VLAN #10. The next terminal 82 has a terminal name of "Station-B" and a MAC address of "00:00:00:00:01:02" and belongs to VLAN #10. The terminal 83 has a terminal name of "Station-C" and a MAC address of "00:00:00:00:01:03" and belongs to VLAN #10. Port #1 of the third network device 63 is used to link with the second network device 62 at its port #2.

The fourth network device 64 has a host name of "L2SW-B1" and a MAC address of "00:00:00:01:00:04." It has four ports with port IDs "1" to "4." Terminals 89 and 90 are linked respectively to ports #3 and #4. The former terminal 89 has a terminal name of "Station-I" and a MAC address of 00:00: 00:00:04:01 and belongs to VLAN #30. The latter terminal 90 has a terminal name of "Station-J" and a MAC address of "00:00:00:00:04:02" and belongs to VLAN #20.

The fifth network device 65 has a host name of "L2SW-B2" and a MAC address of "00:00:00:01:00:05." It has four ports with port IDs "1" to "4." Terminals 86, 87, and 88 are linked respectively to ports #2, #3, and #4. The terminal 86 has a terminal name of "Station-F" and a MAC address of "00:00:00:00:03:01" and belongs to VLAN #10. The terminal 87 has a terminal name of "Station-G" and a AC address of "00:00:00:00:03:02" and belongs to VLAN #20. The terminal 88 has a terminal name of "Station-H" and a MAC address of "00:00:00:00:03:03" and belongs to VLAN #30. Port #1 of the fifth network device 65 is used to link with the fourth network device 64 at its port #2.

Each network device 61 to 65 shown in FIG. 10 has its own virtual network database and MAC address learning table. Referring now to FIG. 11 to 20, the following will provide specific examples of virtual network databases and MAC address learning tables in the first to fifth network devices 61 to 65.

FIG. 11 shows a virtual network database 91 stored in the third network device 63. As explained in FIG. 10, the third network device 63 has four ports #1 to #4, all of which are used for VLAN #10. Accordingly, all entries of the virtual network database 91 of FIG. 11 show the same VLAN ID of "10." The virtual network database 91 also shows the present link status of each port. Currently, every port of the third network device 63 is in a link-up state.

FIG. 12 shows a MAC address learning table 92 stored in the third network device 63. The third network device 63 has ports #1 to #4. As explained in FIG. 10, three ports #2 to #4 out of four are used to serve terminals 81 to 83. The MAC address learning table 92 of the third network device 63 associates those four ports with the MAC addresses of terminals 81 to 83 as shown in FIG. 12.

FIG. 13 shows a virtual network database 93 stored in the second network device 62. As explained in FIG. 10, the second network device 62 has four ports to serve different VLAN domains as follows: port #1 for VLANs #10 to #30, port #2 for VLAN #10, port #3 for VLAN #20, and port #4 for VLAN #30. The virtual network database 93 of FIG. 13 thus has four entries of such VLAN ID assignments, together with the current link status of each port. It indicates that every port is in a link-up state.

FIG. 14 shows a MAC address learning table 94 stored in the second network device 62. As explained in FIG. 10, the link extending from port #1 of the second network device 62 is used to reach remote terminals 86 to 90. Likewise, the link extending from port #2 is used to reach remote terminals 81 to 83. Ports #3 and #4, on the other hand, serve local terminals 84 and 85, respectively. The MAC address learning table 94 of the second network device 62 associates those four ports with the MAC addresses of terminals 81 to 90 as shown in FIG. 14.

FIG. 15 shows a virtual network database 95 stored in the first network device 61. As explained in FIG. 10, the first network device 61 has two ports #1 and #2, both serving VLAN domains #10 to #30. The virtual network database 95 of FIG. 15 thus has two entries of such VLAN ID assignments, together with the current link status of each port. It indicates that every port is in a link-up state.

FIG. 16 shows a MAC address learning table 96 stored in the first network device. As explained in FIG. 10, the link extending from port #1 of the first network device 61 is used to reach remote terminals 81 to 85. Port #2 is used to reach the other set of remote terminals 86 to 90. The MAC address learning table 96 of the first network device 61 associates the two ports with MAC addresses of those terminals 81 to 90 as shown in FIG. 16.

FIG. 17 shows a virtual network database 97 stored in the fourth network device 64. As explained in FIG. 10, the fourth network device 64 has four ports to serve different VLAN domains as follows: port #1 for VLANs #10 to #30, port #2 for VLANs #10 to #30, port #3 for VLAN #30, and port #4 for VLAN #20. The virtual network database 97 of FIG. 17 thus has four entries to record such VLAN ID assignments, together with the current link status of each corresponding port. It indicates that every port is in a link-up state.

FIG. 18 shows a MAC address learning table 98 stored in the fourth network device 64. As explained in FIG. 10, the link extending from port #1 of the fourth network device 64 is used to reach remote terminals 81 to 85. Likewise, the link extending from port #2 is used to reach remote terminals 86 to 88. Ports #3 and #4, on the other hand, serve local terminals 89 and 90, respectively. The MAC address learning table 98 of the fourth network device 64 associates those four ports with the MAC addresses of terminals 81 to 90 as shown in FIG. 18.

FIG. 19 shows a virtual network database 99 stored in the fifth network device 65. As explained in FIG. 10, the fifth network device 65 has four ports to serve different VLAN domains as follows: port #1 for VLANs #10 to #30, port #2 for VLANs #10, port #3 for VLAN #20, and port #4 for VLAN #30. The virtual network database 99 of FIG. 19 thus has four entries of such VLAN ID assignments, together with the current link status of each port. It indicates that every port is in a link-up state.

FIG. 20 shows a MAC address learning table 100 stored in the fifth network device 65. As explained in FIG. 10, three terminals 86 to 88 are connected to ports #2 to #4 of the fifth network device 65. The MAC address learning table 100 associates those three ports with the MAC addresses of terminals 86 to 88 as shown in FIG. 20.

The above section, along with FIGS. 11 to 20, has explained what the network devices 61 to 65 store in their local databases to manage their ports and links. Suppose now that the first network device 61 has received a topology discovery command from the management console 71 through a direct console connection or telnet facility. In response to this command, the network device 61 creates query packets and sends them to other network devices 62 and 64. As mentioned earlier, the network devices 61 to 65 are configured to offer three VLAN domains #10, #20, and #30. The first network device 61 is supposed to discover the network topology of each of those three VLANs.

FIG. 21 shows specific query packets originated by a network device. Specifically, the illustrated three query packets 101 to 103 are what the first network device 61 creates in response to a topology discovery command from the management console 71. Those query packets 101 to 103 contain different VLAN IDs #10, #20, and #30 in their respective VLAN tag fields to specify which VLAN membership is requested to respond. Since the queries have to be broadcast, the packets carry an address value of "FF:FF:FF:FF:FF:FF" in their destination MAC address field. The source MAC address field, on the other hand, contains "00:00:00:01:00:01," the MAC address of the requesting network device 61. The type field is filled in with a code (e.g., 8xxx) indicating that the packets 101 to 103 are for topology discovery purposes. The size field contains a value of six, meaning that the size, main class, and auxiliary class fields are six bytes in total length. The main class field contains a code "1" to mark these packets 101 to 103 as query packets. The auxiliary class field contains a code "1" to indicate that the sender is requesting information about the number of VLAN ports. The network device 61 creates such query packets 101 to 103 and sends them to neighboring subordinate network devices 62 and 64.

Upon receipt of those query packets 101 to 103, the receiving network devices 62 and 64 produce query forwarding packets by appending information about themselves to the received query packets 101 to 103. The network devices 62 and 64 send the produced query forwarding packets to their respective neighboring subordinate network devices 63 and 65.

Figure 22:
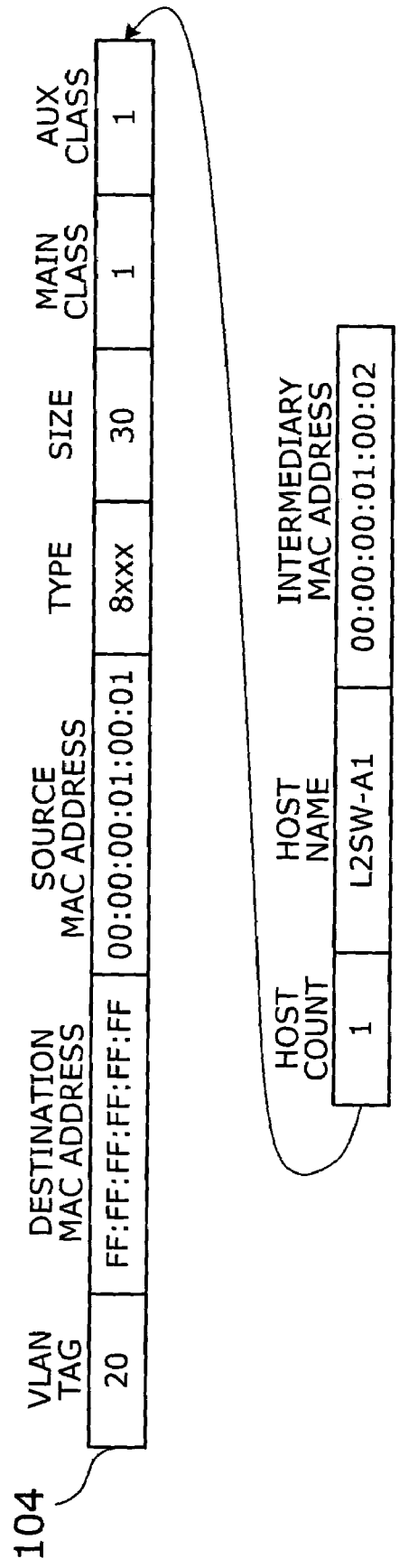
FIG. 22 shows an example data sequence of a query forwarding packet transmitted by intermediate network devices.

FIG. 22 shows an example data sequence of a query forwarding packet transmitted by intermediate network devices. Specifically, the illustrated query forwarding packet 104 is what the second network device 62 produces when a query packet 102 (FIG. 21) is received. It begins with a VLAN tag field carrying a VLAN ID of "20" so as to specify VLAN #20 as the subject of topology discovery. The subsequent destination MAC address field contains a broadcast address "FF:FF:FF:FF:FF:FF." The query forwarding packet 104 maintains the same source MAC address ("00:00:00:01:00:01") as that of the received query packet 102. This address belongs to the first network device 61, the original sender of the query packet 102. The type field is filled in with a value of 8xxx. The size field contains a value of 30, meaning that the total field length of "Size" through "Intermediary MAC Address" is 30 bytes. The host count field is set to one since the second network device 62 is the first host that this packet 104 goes through. The host count field is followed by the host name "L2SW-A1" and MAC address "00:00:00:01:00:02" of the second network device 62, the sender of this query forwarding packet 104.

The query forwarding packet 104 produced as such is transmitted from the second network device 62 to its neighboring subordinate network device 63. In the case that the network device 63 has its own subordinate network devices, it will create a query forwarding packet in a similar way for delivery to the subordinate devices.

Figure 23:
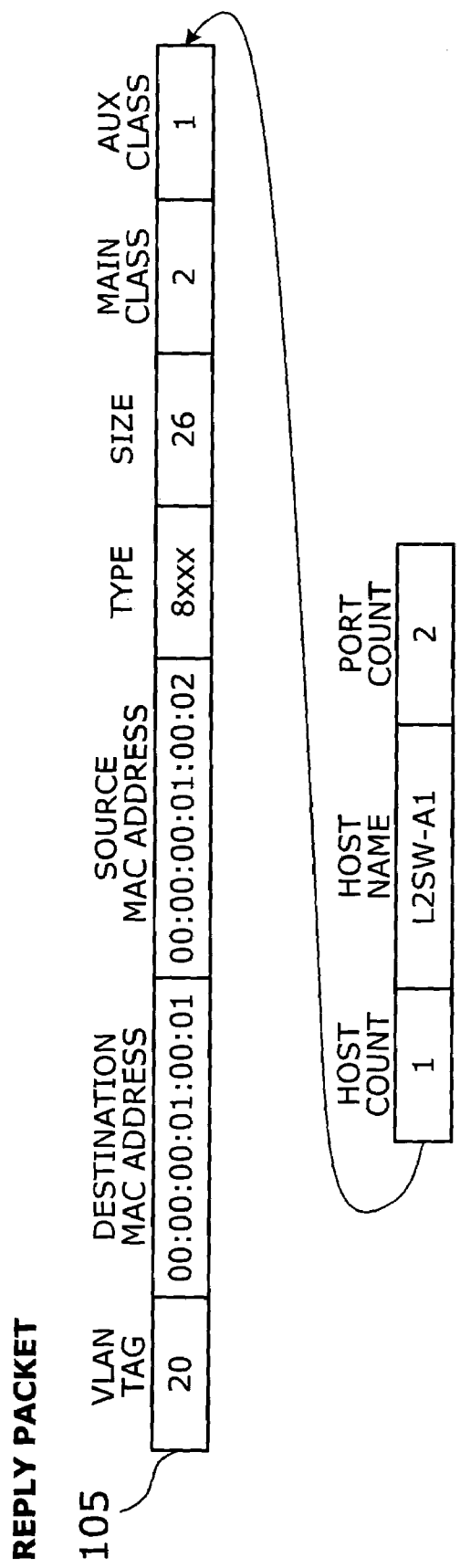
FIG. 23 shows an example data sequence of a reply packet, which network device produces.

The query packets 101 to 103 from the first network device 61 also cause the receiving network devices 62 and 64 to produce reply packets. FIG. 23 shows an example data sequence of such a reply packet. Specifically, the illustrated reply packet 105 is what the second network device 62 produces in response to a query packet 102. Inside the second network device 62, the topology analyzer extracts the information of VLAN ID, main class, and auxiliary class fields out of the received query packet 102. As explained earlier in FIG. 21, the packet 102 has the following parameters: VLAN ID=20, main class=1, and auxiliary class=1.

Because the auxiliary class is set to one, the topology analyzer counts the ports used for VLAN #20, consulting its local virtual network database 93 of FIG. 13. As can be seen from FIG. 13, two ports are serving VLAN #20. The topology analyzer passes the number of such VLAN ports to the topology packet generator, along with the information extracted from the received query packet 102. The topology analyzer commands the topology packet generator to create a reply packet 105. Using the given parameters, the topology packet generator thus creates a reply packet 105 as follows: The VLAN tag field is set to 20, which indicates that this packet provides information about the network topology of VLAN #20. The destination MAC address field contains the MAC address of the first network device 61, to which the reply packet 105 is to be returned. The source MAC address field is filled in with the MAC address of the responding network device 62. The type field is set to 8xxx. The size field is set to 26, which indicates the total length of size field through port count field. The main class field is set to two to indicate that this packet 105 is a reply packet. The auxiliary class field contains the same value as the received query packet 102. The host count field contains a value of one. This is what is stored in the host count field of the query forwarding packet 104 described in FIG. 22. The host name field contains "L2SW-A1," the host name of the second network device 62. The port count field is set to two, which has been determined from the virtual network database 93. The produced reply packet 105 is sent to the first network device 61 through the topology data interface, packet analyzer, and packet interface.

Figure 24:
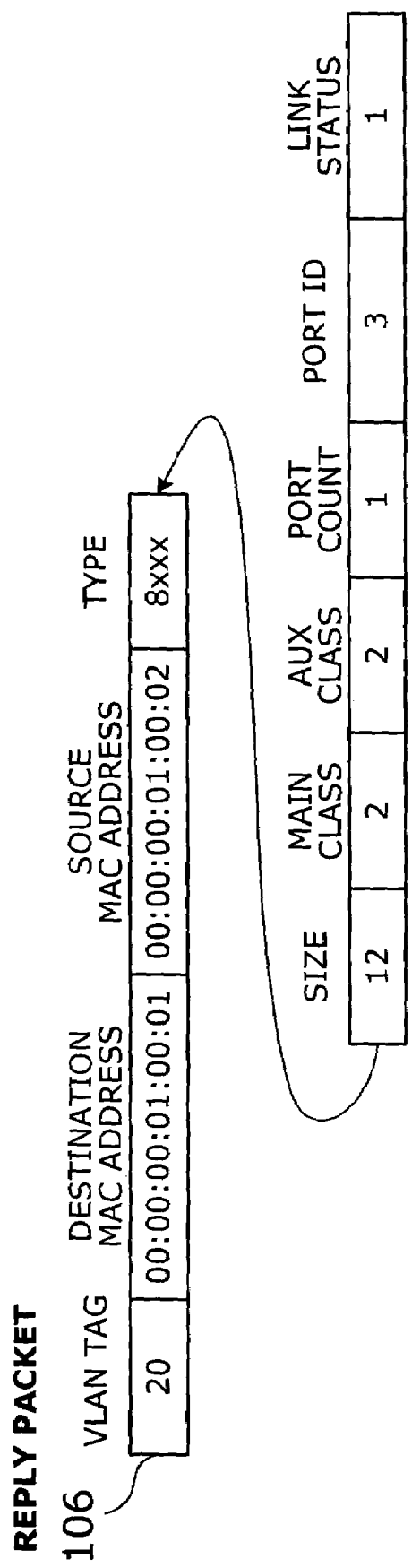
FIG. 24 shows an example data sequence of a reply packet with auxiliary class=2.

The received query packet 102 may have an auxiliary class value of two, meaning that it requests link status information. If this is the case, the responding network device has to create a different reply packet to report the current link status. FIG. 24 shows an example data sequence of this type of reply packet. The illustrated reply packet 106 is created in the second network device 62 in the following way. Upon recognition of auxiliary class=2, the topology analyzer consults its local virtual network database 93 of FIG. 13 to retrieve a record that is relevant to VLAN ID specified in the VLAN tag field of the received query packet 102. The virtual network database 93 provides the number of ports assigned to the specified VLAN, port IDs, and link status. The topology packet generator then creates a reply packet 106 containing all those pieces of information.

Network Topology Diagram

The above-described reply packet 106 is delivered to the first network device 61. The packet analyzer in the first network device 61 examines the received packet 106 to determine what kind of packet it is. Specifically, the type field value "8xxx" indicates that the received packet 106 is for topology discovery purposes. The packet analyzer thus forwards the packet 106 to the topology analyzer through the topology data interface. The topology analyzer compiles a VLAN topology diagram from this reply packet 106 and other reply packets returned from other network devices. The topology analyzer processes the data for each VLAN domain and sends the results on a monitor screen of the management console 71.

FIG. 25 shows a first example of a network topology diagram displayed on a monitor screen. The illustrated screen 111 appears on the monitor unit of the management console 71 in the case where the auxiliary class is set to one.

The screen 111 is formed from three sections with the titles of "VLAN10," "VLAN20," and "VLAN30" representing the identifier of each VLAN in question. Take the section entitled "VLAN10" for example. The first line gives the host name "L2SW-X" and MAC address "00:00:00:01:00:01" of the network device 61 to which a topology discovery command was issued from the management console 71. The next line begins with "port1," which indicates a particular port of the first network device 61. This is followed by a list of host names, showing what devices are connected to that port. In the present example, two host names are listed in series, meaning that the right network device is linked to the left network device in the same VLAN #10 domain. Each host name is accompanied by a figure in square brackets, which tells how many ports of that network device are serving for the VLAN in question. The next line "port2" is presented in a similar way, giving the topology information on another port of the first network device 61.

The network topology diagram shown on the screen 111 can be compiled from reply packets that the first network device 61 receives with auxiliary class=1 from other network devices 62 to 65. With those reply packets, the network device 61 discovers the topology of each VLAN network and outputs the results on a monitor screen of the management console 71 as shown in the screen 111 of FIG. 25.

FIG. 26 shows a second example of a network topology diagram displayed on a monitor screen. The illustrated screen 112 appears on the monitor unit of the management console 71 in the case where the auxiliary class is set to two.

The screen 112 is formed from three sections with the titles of "VLAN10," "VLAN20," and "VLAN30" representing the identifier of each VLAN in question. Take the "VLAN10" section, for example. The first line begins with MAC address "00:00:00:01:00:01" of the network device 61 to which a topology discovery command was issued from the management console 71. The MAC address is followed by port IDs "port1" and "port2" of the first network device 61. The MAC address next to each port ID shows which network device is connected to that port. Similarly, another pair of MAC address and port ID is placed to the right, and the right-most port ID is accompanied by the corresponding link status information in square brackets.

The network topology diagram shown on the screen 112 can be compiled from reply packets that the first network device 61 receives with auxiliary class=2 from other network devices 62 to 65. With those reply packets, the network device 61 discovers the topology of each VLAN network and outputs the results on a monitor screen of the management console 71 as shown in the screen 112 of FIG. 26.

To summarize the above, the network devices according to the first embodiment are designed to send query packets and query forwarding packets to their subordinate devices, so that every network device will receive a request for topology discovery information. Each receiving device answers such query or query forwarding packets by sending a reply packet back to the original sender of the query, thus permitting the requesting network device to discover the network topology of each individual VLAN domain from the received reply packets.

The present invention eliminates the need for a separate topology analysis tool because all necessary functions for topology discovery are incorporated in the network devices themselves. The proposed features help the network administrator to set up VLANs quickly and easily. The discovery process includes the task of collecting link state information of each port, thus making possible to monitor the operating status of network devices as well as to detect link failures. Besides reducing the time required for topology analysis, the fully automated discovery process of the present invention eliminates the chance of human errors and consequent network troubles.

Second Embodiment

Figure 27:
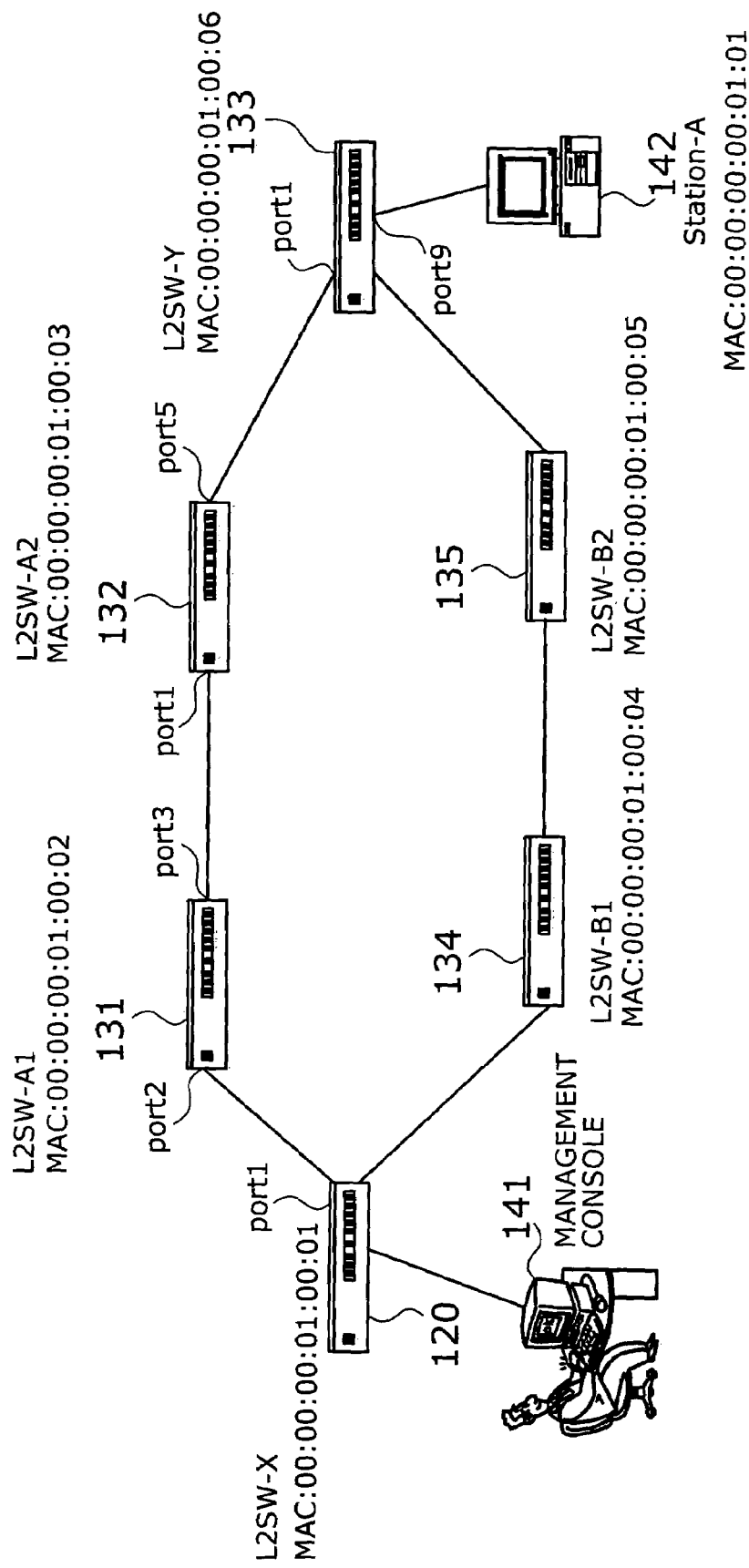
FIG. 27 shows an example system involving network devices according to a second embodiment of the present invention.

Referring now to FIG. 27 and subsequent diagrams, this section describes a second embodiment of the present invention. The second embodiment is directed to a network system having a physical loop in the topology. Network devices in such a system have to control the paths of packets in order to prevent packets from flooding due to a loop. The second embodiment offers a function to discover packet delivery routes in a VLAN environment with a physical loop.

FIG. 27 shows an example system involving network devices according to the second embodiment of the present invention. The illustrated network involves six network devices 120 and 131 to 135, which are layer-2 switches that provide switched paths for delivering packets according to the layer-2 specifications of the ISO reference model. Attached to the left-most network device 120 is a management console 141 for use by a network administrator. A remote terminal 142 (e.g., personal computer) is linked to the network device 133.

The names and addresses of those network devices are as follows: The first network device 120 has a host name of "L2SW-X" and a MAC address of "00:00:00:01:00:01." The second network device 131 has a host name of "L2SW-A1" and a MAC address of "00:00:00:01:00:02." The third network device 132 has a host name of "L2SW-A2" and a MAC address of "00:00:00:01:00:03." The fourth network device 133 has a host name of "L2SW-Y" and a MAC address of "00:00:00:01:00:06." The fifth network device 134 has a host name of "L2SW-B1" and a MAC address of "00:00:00:01:00:04." The sixth network device 135 has a host name of "L2SW-B2" and a MAC address of "00:00:00:01:00:05." The terminal 142 has a host name of "Station-A" and a MAC address of "00:00:00:00:01:01."

With a command from the administrator, the first network device 120 sends a route query packet to other network devices 131 to 135 so as to discover a path for delivering packets to the remote terminal 142. The route query packet has a "Time To Live" (TTL) field. The first network device 120 transmits a series of route query packets with successively larger TTL values. The other network devices 131 to 135 forward such route query packets to their respective subordinated devices, decrementing TTL field values by one. When a received route query packet has a TTL value of zero, the network devices 131 to 135 send a route reply packet back to the requesting network device 120. The network device 120 examines those route reply packets sent back from the other network devices 131 to 135, thus identifying what route a packet would take to reach the terminal 142.

Figure 28:
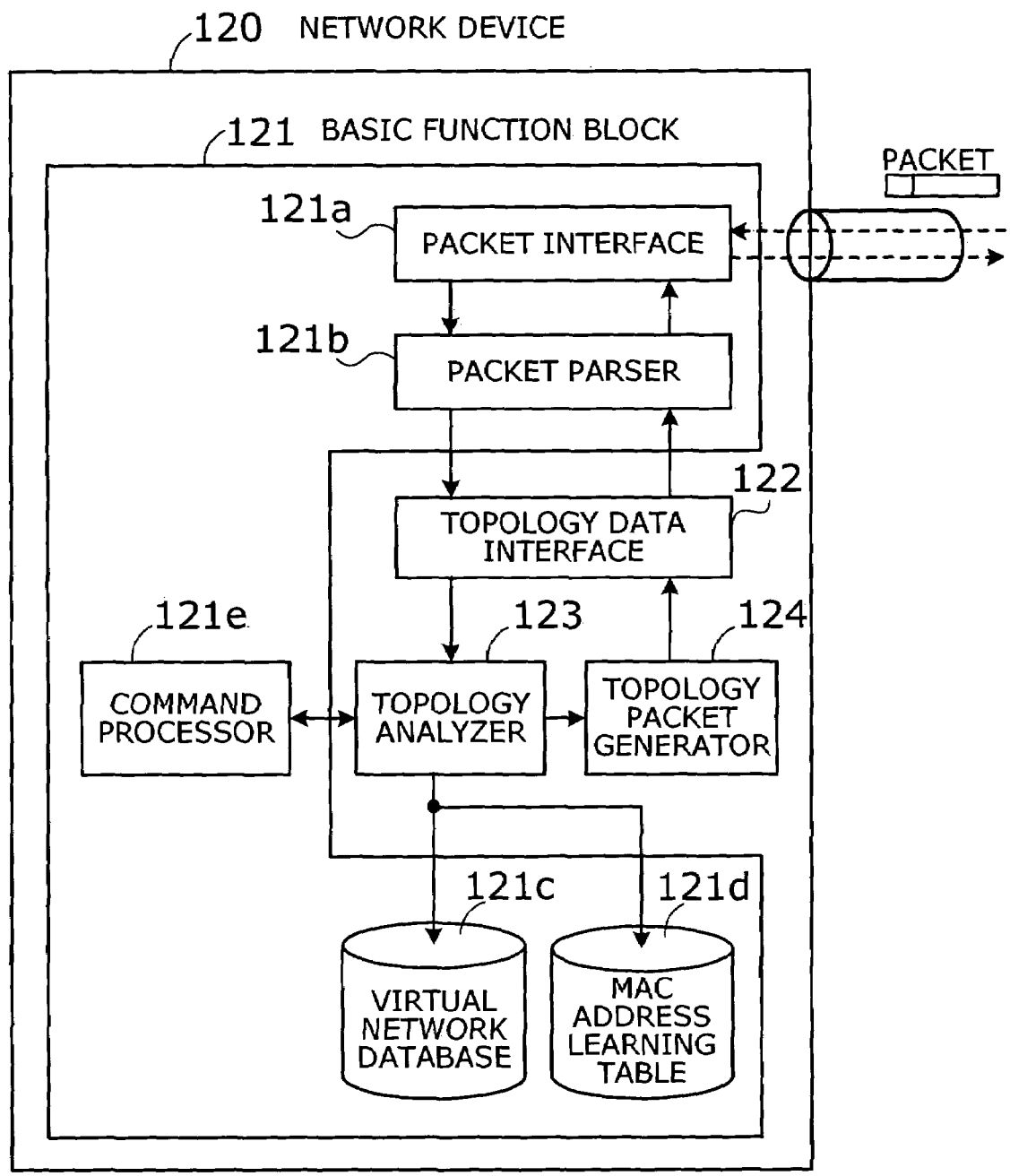
FIG. 28 is a functional block diagram of a network device according to the second embodiment.

FIG. 28 is a functional block diagram of the network device 120 according to the second embodiment. As can be seen from this diagram, the network device 120 has the following functional elements: a basic function block 121, a topology data interface 122, a topology analyzer 123, and a topology packet generator 124. Other network devices 131 to 135 in FIG. 27 have the same functional blocks as those of the network device 120 shown in FIG. 28.

The basic function block 121 offers various fundamental functions to transmit and receive packets to/from peer network devices. Specifically, the basic function block 121 contains a packet interface 121a, a packet parser 121b, a virtual network database 121c, a MAC address learning table 121d, and a command processor 121e. Those elements have the functions described below.

The packet interface 121a serves to transmit and receive packets to/from other network devices. Incoming packets include: route query packets, route reply packets, and other ordinary packets transmitted back and forth between terminals. The packet parser 121b sorts out those incoming packets according to their types. If the received packet is either a route query packet or a route reply packet, the packet parser 121b routes it to the topology data interface 122.

The virtual network database 121c is a database storing information about for which VLAN each port of the network device 120 is used. Its actual data structure is similar to what has been described earlier in FIG. 4. The virtual network database 121c is constructed on a physical storage medium such as HDD or RAM.

The MAC address learning table 121d is a table containing MAC addresses of devices connected to each port of the network device 120. Every linked device can be recognized at the corresponding port, and its MAC address is registered with the MAC address learning table 121d. Its actual data structure is similar to what has been described earlier in FIG.

5. The MAC address learning table 121d is constructed on a physical storage medium such as HDD or RAM.

The command processor 121e receives commands from the management console 141 (not shown).

The topology data interface 122 supplies the topology analyzer 123 with incoming route query packets and route reply packets extracted by the packet parser 121b. The topology data interface 122 also provides the packet parser 121b with outgoing route query packets and route reply packets produced by the topology packet generator 124.

The topology analyzer 123 instructs the topology packet generator 124 to produce a route query packet, according to a command from the management console 141 when it is received by the command processor 121e.

In the case where the management console 141 is attached to other network device, the network device 120 of FIG. 28 has a chance to receive a route query packet from that device. The topology analyzer 123 in the network device 120 then instructs the topology packet generator 124 to modify the received route query packet by subtracting one from the TTL field of that packet. If the subtraction yields a zero-valued TTL, the topology analyzer 123 commands the topology packet generator 124 to produce a route reply packet as an answer to the received route query packet. To assist the topology packet generator 124 in doing this task, the topology analyzer 123 retrieves necessary data from the virtual network database 121c and MAC address learning table 121d.

The topology analyzer 123 looks into route reply packets sent from remote network devices to discover VLAN packets routes. The result of this route discovery is sent to the management console 141 so that the administrator can view the result on a monitor screen.

The topology packet generator 124 produces route query packets and route reply packets as instructed by the topology analyzer 123. The produced packets are passed to the topology data interface 122.

Route Query Packet

Figure 29:
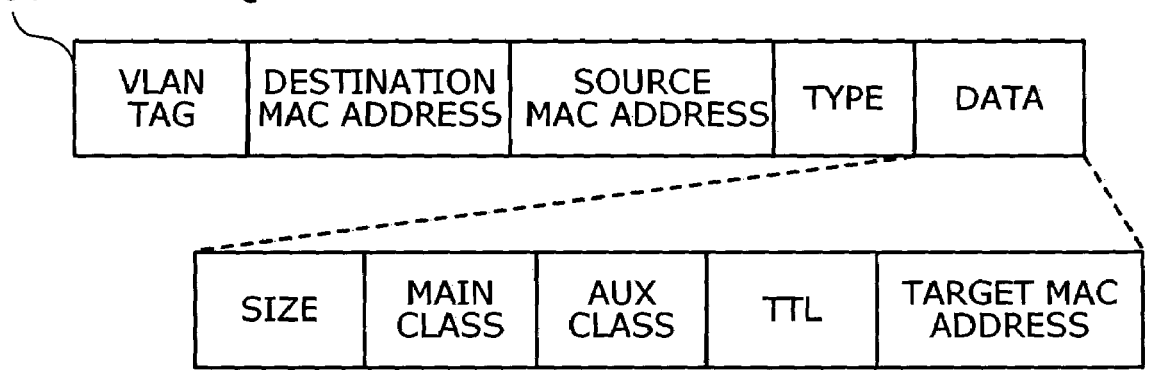
FIG. 29 shows an example data sequence of a route query packet.

This section describes route query packets in detail. FIG. 29 shows an example data sequence of a route query packet. The illustrated route query packet 151 has the following fields: "VLAN Tag," "Destination MAC Address," "Source MAC Address," "Type," and "Data." The "Data" field is further divided into "Size," "Main Class," "Aux Class," "TTL," "Target MAC Address" fields. This packet frame structure is compatible with the packet 51 of FIG. 6, thus permitting route query packets 151 to be delivered by network devices with layer-2 switching functions.

The VLAN tag field contains a VLAN ID that specifies for which VLAN domain this route query packet 151 is intended. The destination MAC address field contains a value of "FF:FF:FF:FF:FF:FF" to indicate that the route query packet 151 is to be broadcast to all relevant network devices. The source MAC address field contains a MAC address identifying the sender of this route query packet 151. In the context of FIG. 27, it is the network device 120 that broadcasts a route query packet 151 to other network devices upon instruction from the management console 141. The source MAC address field thus contains the MAC address of this network device 120. The type field contains a particular type code indicating that the packet is intended for packet route discovery. A new, unused type code is assigned for this purpose.

The size field contains a two-byte value showing the total field length of "Size" through "Target MAC Address." The main class field carries a code "1" to indicate that this packet is a route query packet. The auxiliary class field contains a code "3" to indicate that the sender is requesting information about packet delivery routes. The TTL field carries a time-to-live value, which is decreased by one each time the packet passes through a new network device. The target MAC address field specifies the end terminal that this route query packet 151 is seeking.

As mentioned in FIG. 28, the topology analyzer 123 instructs the topology packet generator 124 to produce a route query packet 151, in response to a user command parsed by the command processor 121e. The produced route query packet 151 is sent to network devices 131 to 135 that can be reached through established routes of packets. The network devices 131 to 135 subtract one from the TTL field of received route query packets 151 and forward them to neighboring subordinate network devices unless the new TTL field has a non-zero value. When TTL has reached zero at a particular network device, that network device creates a route reply packet and sends it back to the requesting network device 120 as a response to the route query packet 151.

Route Reply Packet

Figure 30:
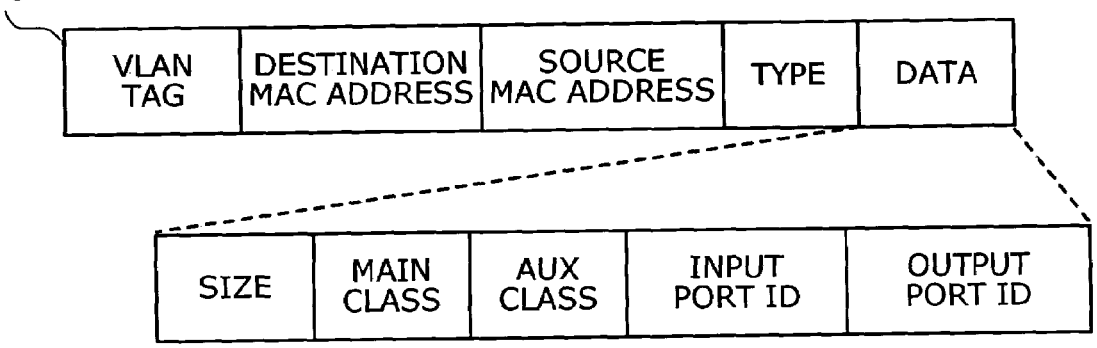
FIG. 30 shows an example data sequence of a route reply packet.

This section describes route reply packets in detail. FIG. 30 shows an example data sequence of a route reply packet. The illustrated route reply packet 152 has the following fields: "VLAN Tag," "Destination MAC Address," "Source MAC Address," "Type," and "Data." The data field is further divided into "Size," "Main Class," "Aux Class," "Input Port ID," and "Output Port ID" fields. This packet frame structure is compatible with the packet 51 of FIG. 6, thus permitting route reply packets 152 to be delivered by network devices with layer-2 switching functions.

The VLAN tag field contains a VLAN ID that specifies for which VLAN domain this route reply packet 152 is intended. The destination MAC address field carries the MAC address of the original sender of the route query packet 151. The source MAC address field contains a MAC address identifying the network device sending this route reply packet 152 in response to a route reply packet 152 that it has received. The type field contains a type code indicating route discovery purposes. A new, unused type code is assigned to this field.

The size field shows the total length of "Size" through "Output Port ID" fields. The main class field carries a code "2" to indicate that this packet is a route reply packet. The auxiliary class field contains a code "3" to indicate that the responding network device is providing information about packet delivery routes. The input port ID field contains a port ID indicating through which port the responding network device has received the route query packet 151 with TTL=1. The output port ID field contains a port ID indicating through which port the specified end terminal can be reached. The responding network device can identify those input and output ports by consulting its own MAC address learning table 121d and finding a record relevant to the source MAC address field, as well as a record relevant to the target MAC address field of the received route query packet 151.

Route Discovery Operation

This section describes how the system of FIG. 27 operates according to the second embodiment. Referring to FIG. 27, suppose that the administrator at a management console 141 is using ping commands to check whether a remote terminal 142 is reachable. The terminal 142 has a MAC address of "00:00:00:00:01:01," and it is assumed that all network devices 120 and 131 to 133 have already acquired a record of this MAC address in their respective MAC address learning tables.

Figure 31:
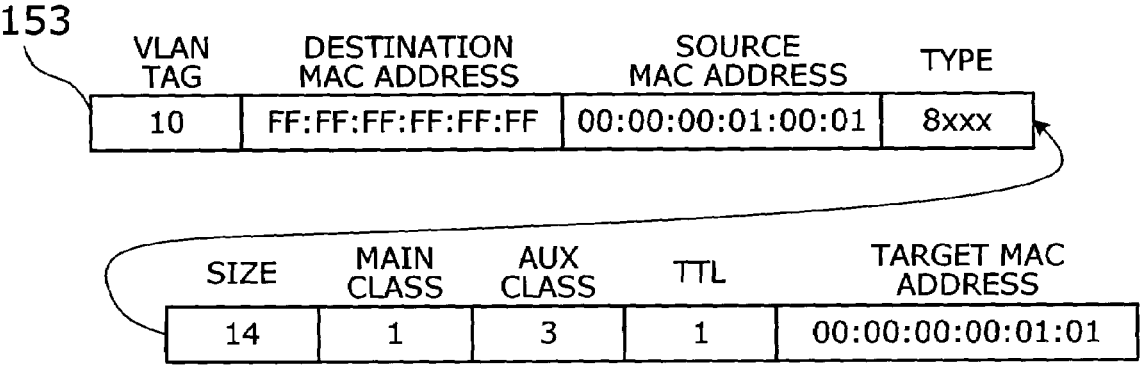
FIG. 31 shows an example data sequence of a route query packet issued from a network device.

The management console 141 makes access to a network device 120 by using a direct console connection or telnet facility. With this management console 141, the administrator commands the network device 120 to discover a correct route of packets to the remote terminal 142. According to this command, the network device 120 issues a route query packet 153 illustrated in FIG. 31. This route query packet 153 begins with a VLAN tag field specifying VLAN #10 as a VLAN domain to be searched. The destination MAC address field contains a broadcast address of "FF:FF:FF:FF:FF:FF." The source MAC address field carries the MAC address of the sender of this route query packet 153, i.e., the network device 120. The type field contains a particular type code indicating that this packet 153 is for route discovery purposes. The size field contains a value of 14, meaning that the total length of "Size" through "Target MAC Address" fields is 14 bytes. The main class field carries a code "1" to indicate that this packet 153 is a route query packet. The auxiliary class field contains a code "3" to indicate that the sender is requesting information about packet delivery routes. The TTL field is set to one in this example. The target MAC address field contains the MAC address of the terminal 142 that the route query packet 153 is seeking.

The network device 120 sends the route query packet 153 to its neighboring subordinate network device 131. The topology analyzer in the receiving network device 131 subtracts one from the TTL field of the received route query packet 153, which results in TTL=0. With reference to its local MAC address learning table, the topology analyzer finds a table entry corresponding to the source MAC address of the route query packet 153. This table entry gives a port ID associated with that source MAC address. The topology analyzer also retrieves another table entry corresponding to the target MAC address of the route query packet 153. This table entry gives a port ID associated with that target MAC address. The topology analyzer directs the topology packet generator to use those two port IDs as input port ID and output port ID, and the topology packet generator creates a route reply packet accordingly.

Figure 32:
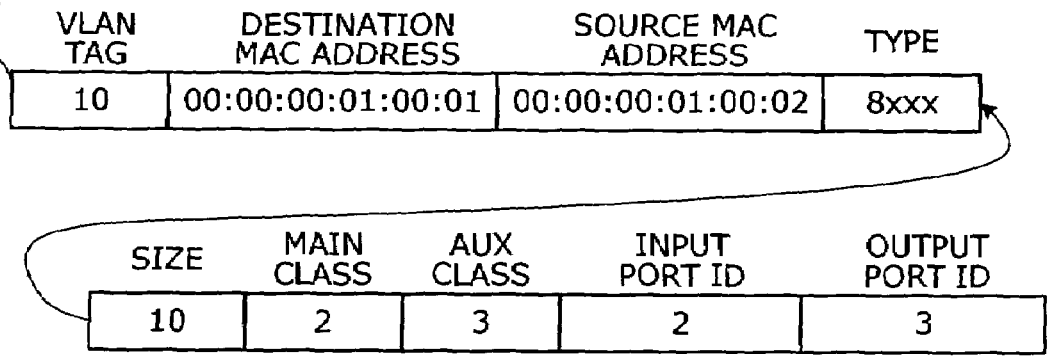
FIG. 32 shows an example data sequence of a route reply packet produced by a network device.

FIG. 32 shows an example of a route reply packet that the network device 131 creates in the above-described way. The illustrated route reply packet 154 begins with a VLAN tag field containing a VLAN ID of 10. The destination MAC address field is set to "00:00:00:01:00:01," which is the MAC address of the network device 120 requesting route information. The source MAC address field contains the MAC address of the network device 131 sending this route reply packet 154. The type field contains a particular type code indicating that this packet 154 is for route discovery purposes. The size field is set to 10 to indicate that the total length of "Size" through "Output Port ID" fields is 10 bytes. The mail class field contains a code: "2" to indicate that this packet 154 is a route reply packet. The auxiliary class field contains a code "3" to indicate that this packet 154 is carrying information about packet delivery routes. The input port ID field contains a port ID "2" indicating that the responding network device 131 has received the route query packet 153 through port #2. The output port ID field contains a port ID "3" indicating that the specified terminal 142 can be reached via port #3.

The network device 120 transmits a series of route query packets having different TTL values with an increment of one, which means that these packets will expire at different network devices. A route reply packet is created at every network device where TTL=0 is observed, and it is sent back to the originating network device 120.

When the initial TTL is set to 4 in the network system of FIG. 27, that route query packet can reach the terminal 142. The terminal 142, however, is unable to return a route reply packet since it is a normal computer device with no route discovery functions. A query with TTL=4 would therefore end up with a timeout. Accordingly, the network device 120 can discover the route of packets up to the network device immediately before the specified terminal 142.

FIG. 33 shows an example screen displaying a packet delivery route. This screen 155 appears on the monitor unit of the management console 141. The first line "VLAN10" means that the packet route discovery has been conducted in the domain of VLAN #10. This is followed by a listing of "Device MAC Address," "IN" (input port ID), and "OUT" (output port ID). The device MAC address field shows the MAC address of each network device on the route. The input and output port ID fields show which ports each network device uses to receive and send packets. All those pieces of routing information can be collected from network devices in the form of route reply packets.

To summarize the second embodiment, one network device generates a series of route query packets with different TTL values. Zero-TTL condition triggers the receiving network device to respond to the query by returning a route reply packet to the originating network device, with input port ID and output port ID contained in that packet. This mechanism permits the originating network device to collect the information about packet delivery routes. The present invention eliminates the need for a separate analysis tool because all necessary functions for route discovery are incorporated in the network devices themselves, including the task of creating and analyzing route query packets and route reply packets. The proposed features help the network administrator to set up VLANs quickly and easily. Besides reducing the time required for route analysis, the fully automated discovery process of the present invention eliminates the chance of human errors and consequent network troubles.

CONCLUSION

According to the present invention, one network device broadcasts query packets for topology discovery and receives reply packets from other network devices. Those query packets and reply packets are adapted to the use in VLAN environments, and the proposed network device enables an administrator to check the topology of each individual virtual network.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network device for building virtual networks, comprising:
   query packet reception means for receiving a first query packet from a requesting network device, the first query packet requesting information for topology discovery of a specified virtual network;
   reply packet generation means for producing a first reply packet in response to the first query packet that is received;
   reply packet transmission means for sending the first reply packet back to the requesting network device;

first query packet transmission means for forwarding the received query packet to subordinate network devices;

query packet originating means for producing and sending a second query packet for each virtual network in response to a command from a terminal linked to the network device;

reply packet reception means for receiving second reply packets from the subordinate network devices;

topology for discovering means for discovering topology of each virtual network, based on the received second reply packets; and display means for displaying the discovered topology on a screen of the terminal.

2. The network device according to claim 1, wherein said reply packet generation means makes the first reply packet contain the number of ports that are assigned to the virtual network specified in the first query packet.

3. The network device according to claim 1, wherein said reply packet generation means makes the first reply packet contain link status information of the port used to receive the first query packet.

4. The network device according to claim 1, wherein said reply packet generation means makes the first reply packet contain a MAC address of the network device.

5. The network device according to claim 1, wherein said query packet transmission means appends information about the network device itself to the second query packet before sending to the subordinate network devices.

6. The network device according to claim 1, wherein:
the received first query packet contains information that has been appended by preceding network devices; and
said reply packet generation means copies the appended information from the received first query packet to the first reply packet.

7. The network device according to claim 5, wherein the information appended to the second query packet includes a MAC address of the network device itself.

8. The network device according to claim 5, wherein the information appended to the second query packet includes a host name assigned to the network device itself.

9. The network device according to claim 1, wherein:
the first query packet contains a MAC address of a specified remote terminal and a time-to-live value that is decremented by one each time the first query packet arrives at a new network device; and
said reply packet generation means makes the first reply packet contain a first port identifier indicating through which port the first query packet has been received and a second port identifier indicating through which port the remote terminal can be reached, when the time-to-live value is zero.

10. A network device for building virtual networks, comprising:
query packet reception means tor receiving a first query packet from a requesting network device, the first query packet requesting information for topology discovery of a specified virtual network;

reply packet generation means for producing a first reply packet in response to the first query packet that is received;

reply packet transmission means for sending the first reply packet back to the requesting network device; and query packet transmission means for forwarding the received first query packet to subordinate network devices;

query packet originating means for creating and transmitting a second query packet for each virtual network in response to a command from a terminal linked to the network device;

reply packet reception means for receiving second reply packets from the subordinate network devices;

route discovering means for discovering a packet delivery route of each virtual network, based on the received second reply packets; and display means for displaying the discovered packet delivery route on a screen of the terminal.

11. The network device according to claim 10, wherein said query packet originating means creates a plurality of second query packets with different time-to-live values.

12. A method for discovering topology of virtual networks built with network devices, the method comprising the steps of:
receiving a first query packet from a requesting network device, the query packet requesting information for topology discovery of a specified virtual network;

producing a first reply packet in response to the first query packet that is received;

sending the first reply packet back to the requesting network device;

forwarding the received first query packet to subordinate network devices;

producing and sending a second query packet for each virtual network in response to a command from a terminal linked to the network device;

receiving second reply packets from the subordinate network devices;

discovering topology of each virtual network, based on the received second reply packets; and displaying the discovered topology on a screen of the terminal.

* * * * *